United States Patent
Berg et al.

(10) Patent No.: US 6,674,713 B1
(45) Date of Patent: Jan. 6, 2004

(54) METHOD AND APPARATUS FOR PROVIDING CONTINUOUS VOICE AND CALL COMMUNICATIONS BETWEEN A DATA NETWORK AND A TELEPHONY NETWORK

(75) Inventors: Diane M. Berg, Fairfax, VA (US); Thomas J. Bova, Arlington, VA (US); Theodore S. Krivoruchka, Jr., Sterling, VA (US); Kenneth A. Morneault, Marshall, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/256,688

(22) Filed: Feb. 23, 1999

(51) Int. Cl.$^7$ .................................................. H04J 1/16
(52) U.S. Cl. ....................... 370/217; 370/352; 370/401; 370/410; 370/467; 370/496; 709/227; 714/1
(58) Field of Search ................................. 370/216–228, 370/242, 244–245, 248, 252, 352, 469, 401, 410, 412–413, 465–467, 522, 524, 496, 241, 247; 340/825.01; 714/1; 709/227

(56) References Cited

U.S. PATENT DOCUMENTS

| | | | |
|---|---|---|---|
| 5,790,553 A | * 8/1998 | Deaton et al. | 370/466 |
| 6,333,931 B1 | * 12/2001 | LaPier et al. | 370/385 |
| 6,339,594 B1 | * 1/2002 | Civanlar et al. | 370/352 |
| 6,356,546 B1 | * 3/2002 | Beshai | 370/358 |
| 6,373,838 B1 | * 4/2002 | Law et al. | 370/352 |

\* cited by examiner

*Primary Examiner*—Dang Ton
*Assistant Examiner*—Inder Pal Mehra
(74) *Attorney, Agent, or Firm*—Hickman Palermo Truong & Becker LLP

(57) ABSTRACT

A method and apparatus are provided for providing continuous voice and call communications between a data network and a telephony network. In one configuration, a first gateway controller that receives the communications from the data network is coupled multiple sessions to a gateway that couples the communications to the telephony network. When the in-use session fails, the communications are automatically switched over from this session to the another session, while maintaining the voice and call communications without interruption, and while ensuring that all messages generated by the gateway are sent to the gateway controller. In another configuration, first and second gateway controllers are designated as Active and Standby. Each of the gateway controllers maintains one or more sessions in communication with the gateway. When the Active gateway controller fails or operator requests a gateway controller switchover, the communications are automatically switched so that communications are directed to the second gateway controller. Accordingly, fault-tolerant voice communication over a packet-switched data network, such as the Internet, is provided. Message queuing may be used to ensure that gateway messages are not lost and reach the gateway controller.

47 Claims, 10 Drawing Sheets

METHOD AND APPARATUS FOR PROVIDING CONTINUOUS VOICE AND CALL COMMUNICATIONS BETWEEN A DATA NETWORK AND A TELEPHONY NETWORK

FIELD OF THE INVENTION

The present invention generally relates to telecommunications. The invention relates more specifically to communicating voice and call signaling information over packet data networks, and managing multiple sessions of such communications.

BACKGROUND OF THE INVENTION

There is significant market need and technical interest in finding ways to communicate voice information and call signaling information over existing data networks. An example application in this field is sending telephone calls, including both the voices of the calling parties and call set-up, tear-down, and related signaling information, over a packet-switched data network. There is particular interest in providing telephone call capability over the global, packet-switched public data network known as the Internet. A key motivation for this technology is that voice calls carried over the Internet do not incur telephone call toll charges, which are imposed by long-distance carriers and certain local telephone call carriers in the public switched telephone network. In short, voice-over-Internet technology may offer callers the ability to place low-cost calls over open protocol networks.

A significant leap forward in this field has been taken by the introduction of protocol conversion and signaling connection systems. An example of such a system is the Cisco SC2200 Signaling Converter, commercially available from Cisco Systems, Inc. Other examples of such a system are described in U.S. patent application Ser. No. 08/904,295 entitled "Universal Protocol Conversion," filed on Jul. 31, 1997 by Lev Volftsun, Clay H. Neighbors, David S. Turvene, Fred R. Rednor, Anatoly V. Boshkin, and Mikhail Rabinovitch, the entire contents of which are hereby incorporated by reference as if fully set forth herein (the "Protocol Converter Disclosure").

Generally, such systems provide a highly specialized computer system that interfaces to the data network and the public switched telephone network. The computer system executes one or more signaling protocol software applications to carry out the function of the system. The computer system may include a gateway that passes data signals to the telephone network and a media gateway controller that controls the gateway under control of a processor in the computer system.

One or more protocol converters may be configured, by running appropriate application software, as call processing devices or as signaling terminal devices. In some configurations, a call processing device is located logically remote from a signaling terminal device, coupled to it by an Internet Protocol (IP) network. In this configuration, there is need to send telephone call signaling information, formatted according to standard telephony protocols, from a signaling terminal device back across the IP network to a call processing device. This is called "backhauling" the signaling information.

A disadvantage of voice-over-Internet systems is that the Internet is open, unregulated, and therefore much less reliable than the public switched telephone network, which is closed and governed carefully by the telephone companies. This disadvantage can cause acute problems when backhauling is carried out.

To provide reliable backhaul, it is important to be able to maintain multiple IP connections or sessions between the signaling terminal device and the call processing device, so that message can be transmitted even when the inherently unreliable IP network fails. The system must be configured so that communications are not interrupted upon network failure, and so that communications can resume when the network comes back up.

One approach to this problem is to allow multiple sessions to be established between nodes of the network. When the IP network fails, one node may switch over to a second, separate session that travels over a different IP network path and therefore bypasses the failure. However, past solutions generally can manage only one session used by a particular signaling path and channel. There is a need for a lightweight management layer below the signaling protocol application to manage sessions used by signaling paths and channels.

One possible approach is to add session management capabilities to the call signaling protocol. However, this is undesirable. Since such an approach involves modifying an established, standard call protocol, it could require extensive study by standards development organizations or the telephone carriers.

There is also a need for a management layer that can use a session group or session set, to maintain multiple connections between a given gateway (acting as client) and media gateway controller (acting as server). This would increase availability of the gateway.

There is particular a need for a system, method or mechanism that can manage multiple Internet Protocol data communication sessions for increased redundancy.

There is also a need for a system, method or mechanism that provides a way to switch from one session to another in the event that one session fails, without losing, duplicating or dropping messages, or calls that are associated to them.

There is also a need for such a system, method or mechanism that can support fault tolerant hardware configurations for the media gateway controller.

There is also a need for such a system, method or mechanism that can save or temporarily hold messages communicated between the network nodes while a fault tolerant switchover procedure is occurring, to prevent such messages from being lost, duplicated or discarded.

SUMMARY OF THE INVENTION

The foregoing needs and objects, and other needs and objects that will become apparent from the following description, are fulfilled by the present invention, which comprises, in one embodiment, a session manager that can manage multiple data network voice communication sessions for increased redundancy. The session manager operates logically above a reliable communication layer. The reliable communication layer determines when or if a session is connected or failed, and may notify the session manager about changes in session state.

The session manager carries out management operations based on availability and priority of each session. The session manager can seamlessly switch a call or signaling information from one IP session to another upon a failure without interruption in service to the signaling protocol. The session manager can manage the fault tolerant configurations of the media gateway controller. The session manager can seamlessly switch message traffic from the gateway to the current active media gateway controller hardware.

In one aspect, the invention provides a method of providing continuous voice and call communications between a data network and a telephony network, comprising the steps of establishing a first session and a second session between a first gateway controller that receives the communications from the data network and a gateway that couples the communications to the telephony network; and when the first session fails, switching over the communications from the first session to the second session while maintaining the voice and call communications and while ensuring that all messages generated by the gateway are sent to the gateway controller.

According to one feature, the method involves providing a session manager server in the first gateway controller; and in the gateway, providing a session manager client that is logically coupled to and served by the session manager server. In a related feature, providing a session manager server comprises the steps of providing a session manager server in the first gateway controller, executed in a logical layer below a signal processing application and above a reliable transport layer.

In another feature, the method involves initializing to an idle state; in response to creation of a session, entering an out of service state; when the session becomes the primary in service session, entering an in service state. According to a related feature, the method further involves, when the first session fails, entering a recovery state; starting a timer set to a pre-determined time value; and returning to the in service state if the first session is restored as the primary session before the timer expires. A related feature involves remaining in the recovery state if another session is created when in the recovery state. Yet another related feature involves entering the out of service state if the timer expires and the first session has not been restored as the primary session.

According to another feature, the method further comprises storing a priority value in association with each session; entering an in service state from the out of service state when the session having the highest priority value becomes the primary in service session; entering a switchover state from the in service state when that session fails; and entering a degraded state from the switchover state when another session having a lower priority value becomes the primary in service session.

The method may also involve re-entering the in service state from the switchover state when the session having the highest priority again becomes the primary in service session, and re-entering the switchover state from the degraded state when the session having the highest priority again becomes the primary in service session.

In another feature, the method provides for starting a switchover timer that is set to a pre-determined time value; and entering the out of service state from the switchover state when no session becomes the primary in service session before the switchover timer expires. A related feature involves accumulating a switchover-failure counter each time that the out of service state is entered from the switchover state; and entering an unstable state when the switchover-failure counter is equal to a pre-determined count.

Yet another related feature involves entering the degraded state from the out of service state when a session having a priority value that is less than the highest priority value becomes the primary in service session.

According to another feature, the method provides for establishing the first session and the second session between a second gateway controller and the gateway; providing a second session manager server in the second gateway controller; and in each of the session manager servers: initially operating in an idle state; entering an out of service state from the idle state when the first session is added and becomes in service; and entering an in service state when the first session becomes the primary in service session.

In another feature, the method further comprises notifying the session manager client that the session manager server is active. A related set of features provides, in the session manager client: initially operating in an idle session state; entering an out of service state from the idle session state when a session becomes available; entering an active in service state from the out of service state when an Active notification is received over the first session and when no Standby notification has been received over any session.

The method may also involve, when the session manager client is in the switchover state, queuing messages to be communicated from the session manager client to the session manager server. In a related feature, the method involves, when the session manager client is in the full in service state: receiving a hold notification; in response to receiving a hold notification, activating a queue that is stored in association with the session manager client and storing each message of the session manager client directed to the session manager server in the queue. The method may also provide for, when the session manager client is in the active in service state: receiving a notification to resume sending messages; in response to the notification to resume sending messages, sending each message in the queue from the session manager client to the session manager server.

Still other features and aspects will become apparent from the following detailed description. The invention also encompasses a computer-readable medium, an apparatus, and a system that may be configured to carry out one or more of the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
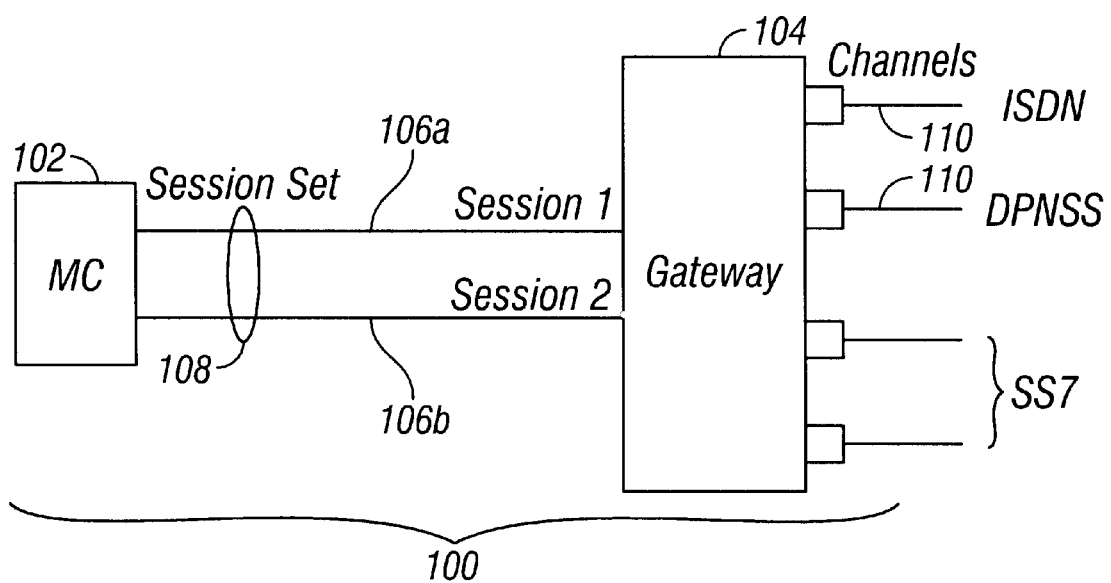
FIG. 1A is a block diagram of a telecommunications system.

A method and apparatus for managing multiple voice communication sessions over a data network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

TERMINOLOGY

In this document, certain technical terms may be used. In this section, preferred definitions of some terms are provided. These are example definitions, and are not meant to be exhaustive or restrictive. Each definition includes all equivalent structures or functions.

"Facility Associated Signaling" or "FAS" is a classification of signaling protocols that provide the signaling channel in the same physical line as the bearer channels. The signaling channel references only those bearer channels in its line.

"Gateway" means a Media Gateway or Signaling Gateway.

"Interface Data Unit" or "IDU" is a generic term defined in standard X.200 of the International Telecommunications Union (ITU) for data passed between protocol layers of a single stack. An IDU contains a PDU plus supplemental control information not included in the PDU.

"Layer 1" means the Physical Layer of the Open Standards Institute (OSI) Reference Model defined in ITU X.200. It is responsible for the electric signal being sent and received. This can be viewed as a bit stream coming in, and going out, of the system. The precise meaning of the term will vary according to its context. For example, Layer 1 on a T1 channel operates at 1.544 Mbps, but Layer 1 on a DS-0 timeslot in the T1 channel is 64 kbps. "Layer 2" is the Data Link Layer of the OSI Reference Model defined in ITU X.200. It is responsible for point-to-point delivery of a PDU. Layer 2 protocols have two basic classes: reliable and unreliable. A reliable protocol means that the protocol guarantees that it will deliver or generate an error message for every message that an application program requests the transport layer using that protocol to transport. An unreliable protocol means that delivery of application program messages may not occur, with no indication to the upper layers.

"Layer 3" is the Network Layer of the OSI Reference Model defined in ITU X.200. It is responsible for the network routing and delivery of a message. Examples of Layer 3 protocols include X.25 Packet Layer Protocol and the Internet Protocol. Q.931 is not considered a Layer 3 protocol because it is not concerned with routing and delivery of a message but rather the message body itself.

"Message Signal Unit" or "MSU" means an MTP 2 signal unit containing MTP 3 and higher layer information.

"Media Gateway" or "MG" is a hardware device and associated software that terminates PSTN facilities such as trunks, packetizes the pulse-coded-modulation signal stream from the trunks into Internet Protocol (IP) packets or Asynchronous Transfer Mode (ATM) packets, or forwards the signal stream to an IP network or ATM network. This device can optionally support signaling backhaul. In a preferred embodiment, a client side implementation of a Session Manager executes on a Media Gateway.

"Media Gateway Controller" or "MC" is a hardware device and associated software that provides call control capability to handle signaling traffic from a variety of sources. It manages connections and resources of the MGs. In a preferred embodiment, the MC executes the server side implementation of a Session Manager.

"Non-Facility Associated Signaling" or "NFAS" refers to a class of signaling protocols in which the signaling channel is carried in a line that is physically separate from the bearer channels.

"Protocol Data Unit" or "PDU" is a generic term in ITU X.200 for the data passed between peer protocol layers. Each layer in the OSIRM has its own definition of a PDU which is formned of the PDU from the next higher layer (N+1) with protocol control information for the N layer encapsulating it.

"Signaling Gateway" or "SG" is a device that sends and receives PSTN signaling at the edge of or at an entry point of an IP or ATM network. It backhauls the PSTN signaling to a Media Gateway Controller (MC). In the preferred embodiment, the client side implementation of Session Manager executes on the SG.

"Voice over IP" means the ability to carry normal telephone-style voice over a network that uses IP, with functionality, reliability, and voice quality equivalent to that provided by conventional telephone service.

STRUCTURAL CONTEXT AND OVERVIEW

FIG. 1A is a block diagram of an exemplary call processing system 100. Media Gateway Controller 102 is coupled to Gateway 104 by at least two sessions 106a, 106b. Each session 106a, 106b is a physical connection between Media Gateway Controller 102 and Gateway 104 that is logically defined by data values that represent a local IP address, local port, remote IP address, and remote port. The values that define a session are stored in memory or similar storage by data processors contained within the Media Gateway Controller and the Gateway.

Collectively, first and second session 106a, 106b comprise a session group 108. In this arrangement, the Session Manager will manage the client, which is Gateway 104, to select among which session is used to pass messages. Each signaling channel 110 is associated with a different communication network that uses the protocol that is associated with the channel. The configuration of FIG. 1A is referred to herein as a "redundant networks" configuration. Each session is associated with a different network. The Gateway 104 may select one network or the other and switch communications to the selected network depending on the availability of the sessions.

Gateway 104 couples information arriving on session set 108 to at least one signaling channel 110. Each signaling channel 110 is a physical termination of a signaling line, such as a T1 or E1 line, V.35 line, etc. Each signaling channel 110 is defined by the protocol family, protocol variant and layer that are terminated, for example, Q.921. Each signaling channel is associated with a signaling path.

A signaling path consists of one or more signaling channels. A signaling path is defined by protocol family, variant and other relevant characteristics specific to the protocol supported by that signaling path. For example, a SS7 path would be equivalent to a linkset and a SS7 channel would be equivalent to a link. An ISDN (FAS) path would be equivalent to a single ISDN D-channel. A signaling path will use a session set, such as session set 108. Multiple signaling paths between the same media gateway controller and gateway can share the same session set. Alternatively, separate signaling paths may be carried over separate session sets.

Media Gateway Controller 102 may be implemented using one or more software programs executed by an appropriate computer system with appropriate network interfaces. An example of a commercially available product that may be adapted for use as Media Gateway Controller 102 is the model VSC2700 Virtual Switch Controller that is commercially available from Cisco Systems, Inc., San Jose, Calif.

Gateway 104 may be implemented using one or more software programs executed by an appropriate computer system with appropriate network interfaces. An example of a commercially available product that may be used as Gateway 104 is the Cisco 2600 router.

Figure 1B:
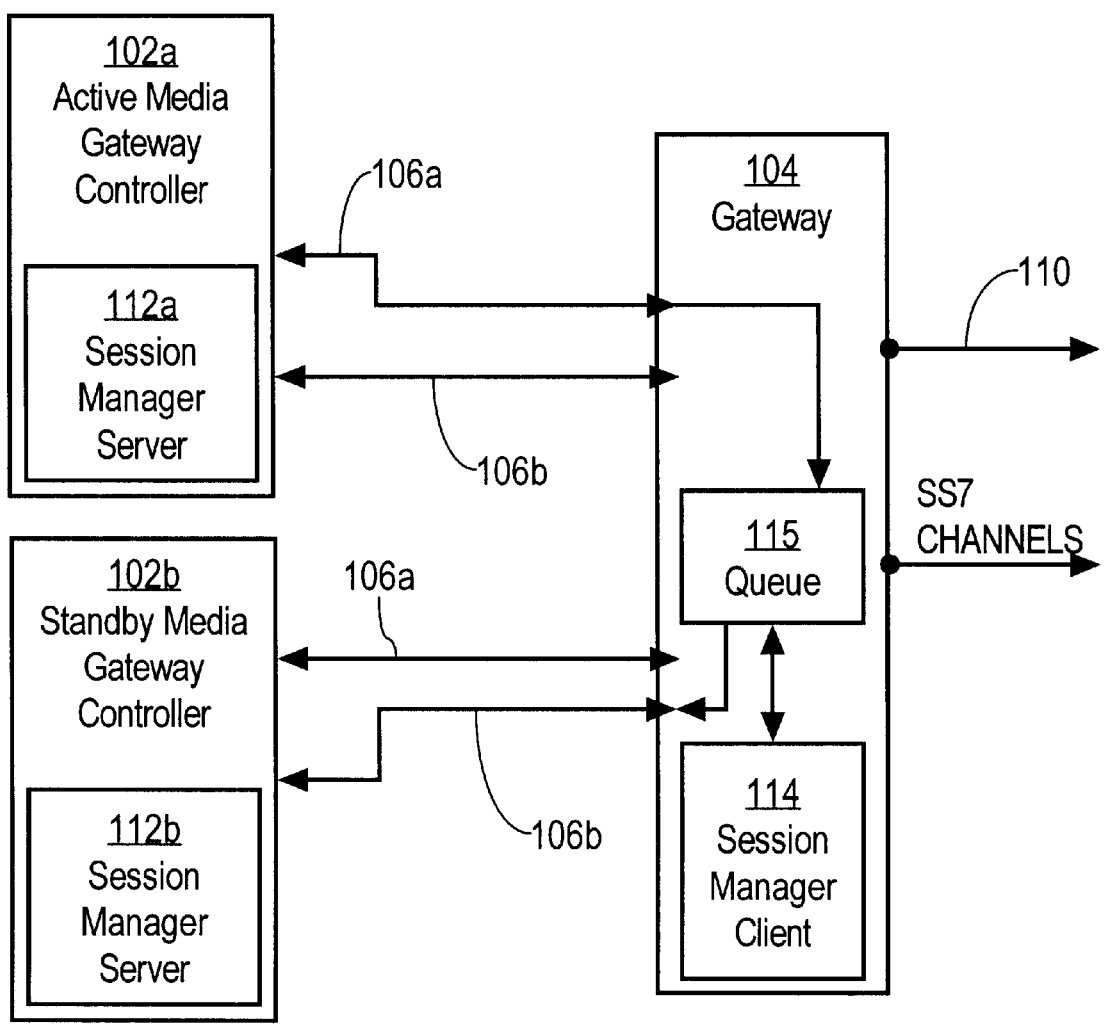
FIG. 1B is a block diagram of a telecommunications system in which an embodiment may be implemented.

FIG. 1B is a block diagram of a call processing system in which an embodiment may be implemented and which includes an Active Media Gateway Controller 102a and a Standby Media Gateway Controller 102b arranged in a fault-tolerant configuration. A first session 106a and a second session 106b are established between Active Media Gateway Controller 102a and Gateway 104. The same first and second sessions 106a, 106b are established between Standby Media Gateway Controller 102b and Gateway 104.

Collectively, sessions 106a, 106b comprise a session group 108. A session group is used when redundancy or fault-tolerance is required. The Session Manager provides a way to manage session sets for a signaling application. When one or more session groups are associated with one another, as in FIG. 1B, the sessions and session groups are collectively referred to as a session set. Each session group in a session set provides connectivity to a different Media Gateway Controller. Session sets are used only in the fault-tolerant configuration. A session set provides fault-tolerant session communications.

To associate sessions and session sets, the Media Gateway Controllers and Gateway store data values in memory or in non-volatile storage.

The fault-tolerant configuration is useful for ensuring continuous communications. If one Media Gateway Controller fails, the Gateway can switch to another that is available without switching networks. Such switching also can be done voluntarily or by an administrator, for example, when a particular Media Gateway Controller needs preventive maintenance or simply to test that the switching process works.

According to one embodiment, a lightweight management layer below the signaling protocol application is provided, to manage session sets used by signaling paths and channels. The use of a session set is desirable to maintain multiple connections between a given gateway (client) and media gateway controller (server). This increases the availability of the gateway.

In the preferred embodiment, the Session Manager is implemented in the form of a client software element and a server software element which provide services to one or more signaling software applications that execute on a protocol converter. The client software element executes on the gateway. The server software element executes on the media gateway controller.

Referring again to FIG. 1B, Active Media Gateway Controller 102a executes Session Manager server 112a and Standby Media Gateway Controller 102b executes Session Manager server 112b. Gateway 104 executes Session Manager client 114. A queue 115 is stored in Gateway 104 and controlled by Session Manager client 114 using means described below.

Figure 2:
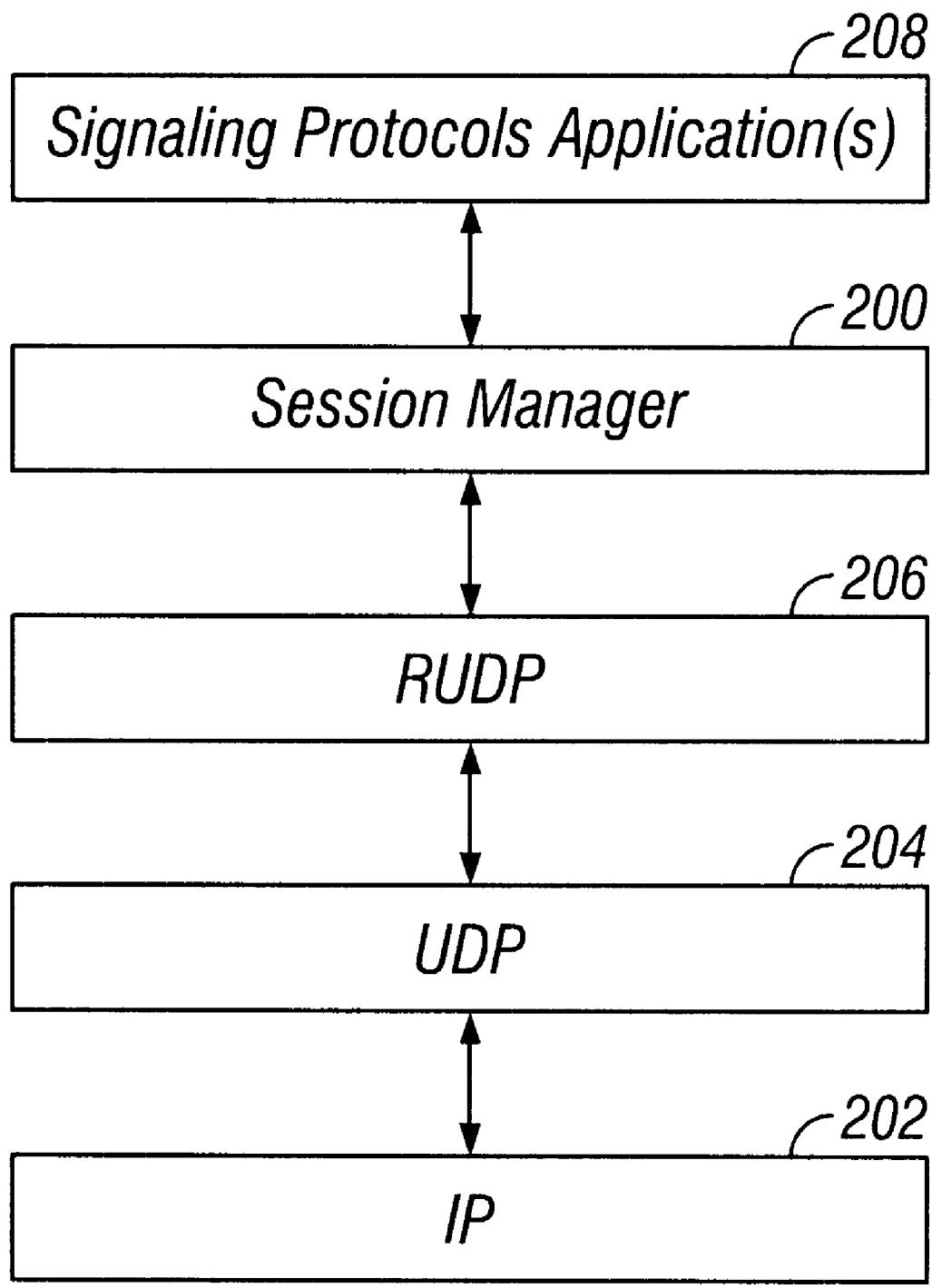
FIG. 2 is a block diagram of logical layers in which an embodiment may be organized.

FIG. 2 is a block diagram of a preferred logical arrangement of Session Manager 200 in relation to other software elements that may make up a call processing system and which may execute on or in association with a media gateway controller and a gateway.

In this logical arrangement, Internet Protocol (IP) software 202 is positioned at the lowest logical layer, which corresponds to Layer 3 of the OSI reference model. At OSI Layer 4, UDP protocol software 204 is used. A Reliable UDP (RUDP) layer 206 runs on top of the UDP protocol software. Session Manager 200 runs on RUDP layer 206. The RUDP layer 206 may be based upon the information provided in Internet Requests For Comments, namely RFC 1151 and RFC 908, both entitled Reliable Data Protocol, and may be implemented in one or more software elements that may conform to the specifications set forth in Appendix 1.

One or more signaling protocol applications 208 may execute at a logical position above Session Manager 200. Examples of signaling protocol applications include the applications that are described in the Protocol Converter Disclosures.

The identification of IP, UDP, and RUDP in FIG. 2 is merely exemplary. The Session Manager 200 may run above any reliable communication mechanism; RUDP is just one example of such a mechanism. In this context, a communication mechanism or protocol layer is "reliable" when it guarantees that it will deliver or generate an error message for every message that an application program requests the transport layer using that protocol to transport. Similarly, any appropriate protocol may be used at either OSI Layer 3 or Layer 4.

FUNCTIONAL OVERVIEW

The basic function of the Session Manager is to manage sessions in a session set in order to maintain connectivity between a media gateway controller and a gateway. Session Manager can provide this function for one or more applications. Generally, in a preferred embodiment, a Session Manager or signaling session management layer can:

1. Manage sessions in a session set based on priority and availability. Only the client side needs to know the priority of a particular session because the client determines which network to switch over to.

2. Provide a mechanism to handle session failure and switchover to an available session.

3. Provide a mechanism to support fault-tolerant configurations. This mechanism will include notifying the Gateway of the state of the Media Gateway Controller (ACTIVE or STANDBY). It will also include managing the state or orientation of the Gateway (ACTIVE or STANDBY).

4. Allow the application to control state of a session set or sessions. If multiple applications are using the same session set, the applications are responsible for coordinating session management. In effect, an operator may manually cause a session switchover.

5. Provide a mechanism for querying the state of the session sets or sessions.

6. Provide a mechanism for autonomous notification of session set or session change of service state.

7. Provide a mechanism for querying statistics of session sets or sessions.

8. If available, work with a reliable transport layer to circumvent the duplication of packets on session switchovers by enabling a function of the layer that precludes such duplication.

9. Monitor the frequency of how often the session is switched and recovered. If the frequency is larger than a pre-defined threshold, then the session is deemed to be unstable, and an alarm and appropriate operation are taken to address the situation.

10. Avoid "ping-pong" effects that may result from failing over sessions several times in a short period of time. Multiple failovers in a short period of time may cause rapid switching from one network to another, which is undesirable.

SUPPORTING STRUCTURES

In the following description, the term "Session Manager" should be understood to encompass either Session Manager server 112a, 112b of FIG. 1B, or Session Manager client 114 of FIG. 1B, or Session Manager 200 of FIG. 2, as the context may require.

1. MESSAGES

In order to fulfill its functions, the client and server portions of Session Manager pass messages between each other. Start, Stop, Active and Standby messages are defined. The Start message is sent by the client to activate a session to make it available for transmission and reception of PDUs. The Stop message will be sent by the client to deactivate a session for transmission and reception of PDUs. The Active and Standby messages will be used by the server to indicate that it is entering the ACTIVE state or the STANDBY state.

2. MESSAGE HEADER

Each message comprises a message header. The message header comprises a message type value. Valid messages types, and example values, may include:

Start Message (0x0)
Stop Message (0x1)
Active Message (0x2)—used for Fault Tolerant configuration
Standby Message (0x3)—used for Fault Tolerant configuration
Queue Hold Invoke Message (0x4)—used for Fault Tolerant configuration
Queue Hold Response Message (0x5)—used for Fault Tolerant configuration
Queue Resume Invoke Message (0x6)—used for Fault Tolerant configuration
Queue Resume Response Message (0x7)—used for Fault Tolerant configuration
Queue Reset Invoke Message (0x8)—used for Fault Tolerant configuration
Queue Reset Response Message (0x9)—used for Fault Tolerant configuration
PDU (0x8000)—Non Session Manager message from application Messages that are used by the Session Manager, and which are not passed to the application, have values in the range 0–0x7fff.

In addition to the message type value, the message header may also contain a version number value and a spare value or field. The version number value is used to ensure that a particular version of the server and client are compatible with one another. In one embodiment, the message header is 32 bits in size.

3. SESSION STATES

A session can be in one of three states:

Out-of-Service: a session has been created, but is not connected at the transport layer.

In-Service: a session has been created and is connected at the transport layer.

Primary In-Service: a session is In-Service and a START message has been transferred from client to server.

OPERATION OF SESSION MANAGER

Session Manager is used when redundant sessions are required between a media gateway controller, acting as server, and a gateway, which acts as client.

Each session is given a priority value which is created and stored by Session Manager. The highest priority session has a priority value of "1".

Session Manager keeps all of the highest priority sessions at the In-Service state. Optionally, Session Manager can keep all lower priority sessions In-Service. If an In-Service session fails or goes Out-of-Service, Session Manager periodically attempts to bring that session back to the In-Service state.

Session Manager only transmits and receives PDUs over the Primary In-Service session in order to avoid sequencing problems. Thus, only one session can be Primary In-Service at a given time. The Session Manager client 114 will coordinate which In-Service session is primary.

1. SESSION MANAGER SERVERS

Session Manager server 112a, 112b can be in one of four states: Idle, Out-of-Service, In-Service, or Switchover. In the Idle state, a session set has been created. In the Out-of-Service state, a session or sessions have been added to the session set, but there is no Primary In-Service session. However, there may be one or more In-Service sessions. In the In-Service state, one of the sessions is in the Primary In-Service state. Before it can transition to the In-Service state, the Session Manager server 112a, 112b must have received the START message from Session Manager client 114. In the Switchover state, the Primary In-Service session has failed, and a recovery timer mechanism has been set.

Figure 3A:
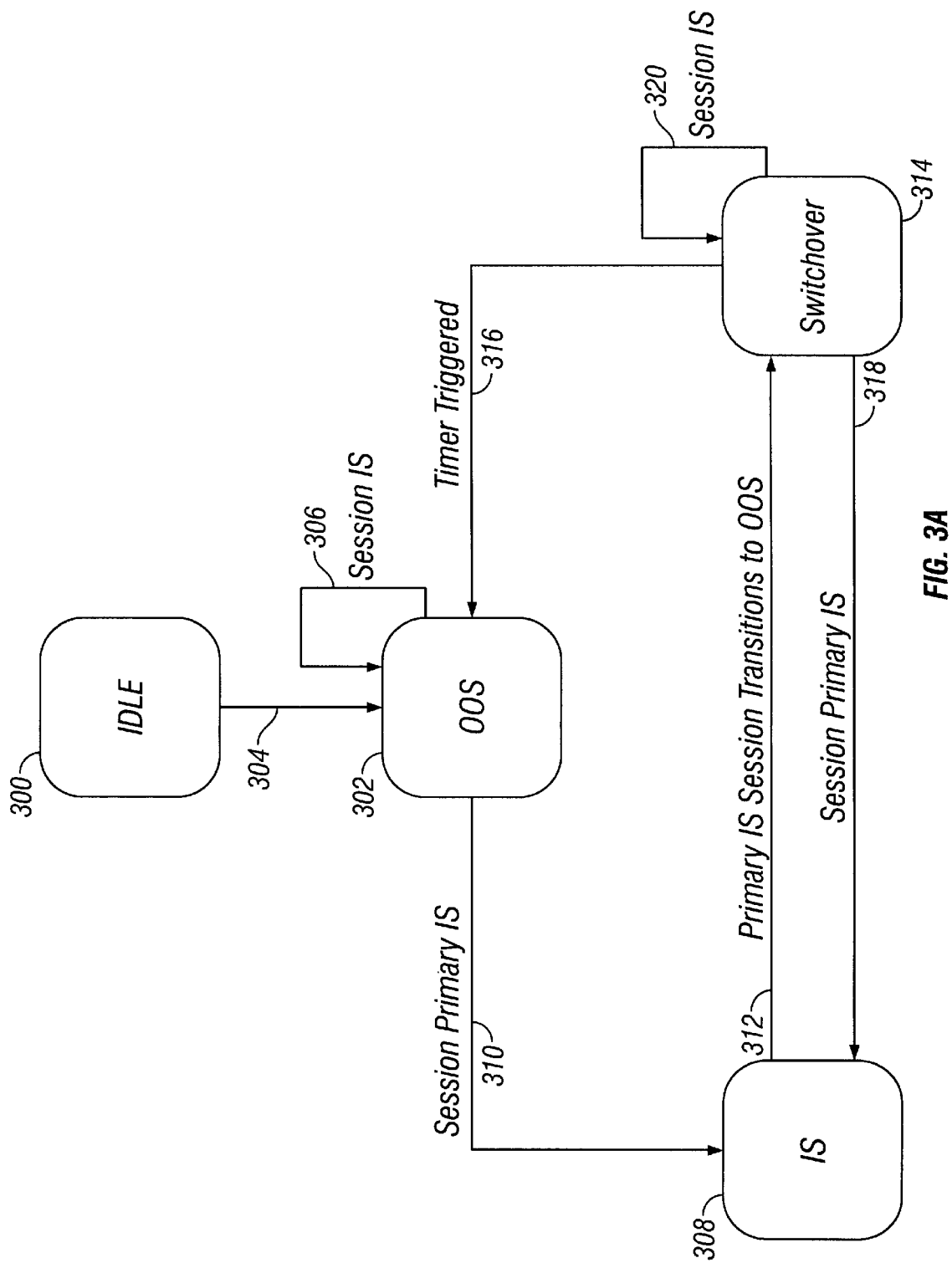
FIG. 3A is a state diagram of states in which a session manager server may operate within the context of redundant networks.

FIG. 3A is a state diagram showing states in which Session Manager servers 112a, 112b may operate. A session set is created by the signaling protocol application. Session Manager servers 112a, 112b enter the Idle state 300. Servers 112a, 112b transition to the Out-of-Service state 302 when one or more sessions are added to the session set, as indicated by arrow 304.

As sessions come In-Service, as indicated by arrow 306, Session Manager servers 112a, 112b remain Out-of-Service until a session is selected to be primary. A session is selected to be primary, for example, when Session Manager client 114 sends a START message over an In-Service session. At this point, Session Manager servers 112a, 112b will transition to the In-Service state 308, as indicated by arrow 310, and will remain In-Service unless the Primary In-Service session fails. In that case, as indicated by arrow 312, Session Manager servers 112a, 112b transition to the Switchover state 314.

In the Switchover state 314, Session Manager servers 112a, 112b set a recovery timer and wait for the Session Manager client 114 to make another session primary. If the Session Manager client 114 makes another session primary, then Session Manager servers 112a, 112b transition to In-Service state 308, as indicated by arrow 318. If the timer expires, the Session Manager servers 112a, 112b transition to Out-of-Service state 302, as indicated by arrow 316. If other sessions move to In-Service state, the Session Manager servers 112a, 112b remain in the Switchover state 314, as indicated by arrow 320, until one of these session is transitioned to the Primary In-Service state.

In an alternate embodiment, if the currently active session is a secondary session, the Session Manager server 112a, 112*b* may indicate a degradation in service by entering another state, such as an In-Service-Degraded state.

2. SESSION MANAGER CLIENT

Session Manager client 114 may operate in one of five states: Idle, Out-of-Service, In-Service, Switchover, or IS-Degraded.

In the Idle state, a session group has been created. In the Out-of-Service state, one or more sessions have been added to the session group, but there is no active session. Thus, the current session is connected, but the Start message has not been sent. In the In-Service state, one of the highest priority sessions is Primary In-Service. In the Switchover state, the active session has failed, and Session Manager will attempt to bring next highest priority session In-Service. Thus, the Switchover state is used when the system is switching to a different, available session so that communication may be carried out upon a network failure. In the IS-Degraded state, one of the lower priority sessions is Primary In-Service.

Figure 3B:
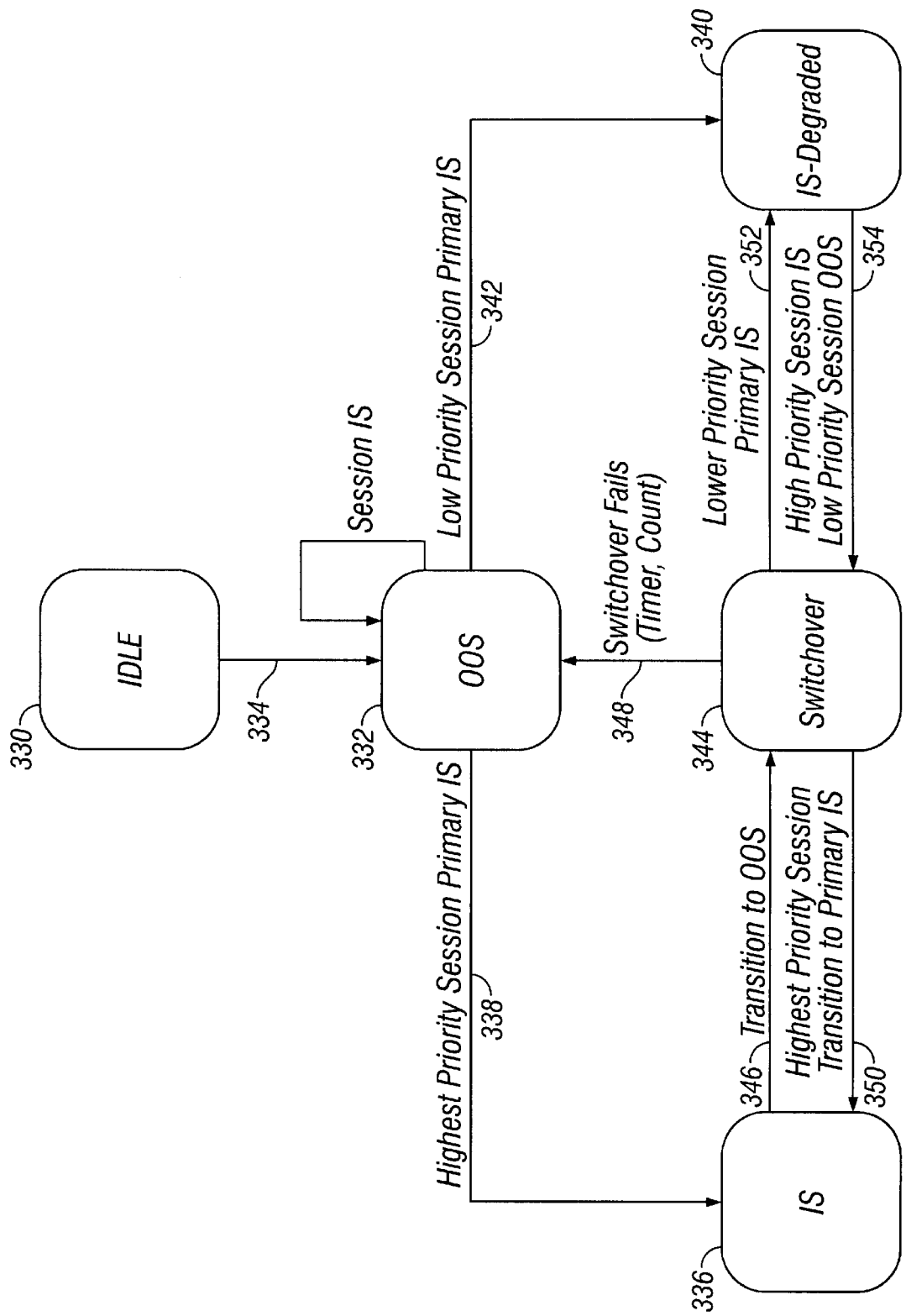
FIG. 3B is a state diagram of states in which a session manager client may operate within the context of redundant networks.

FIG. 3B is a state diagram showing states in which Session Manager client 114 may operate. Session Manager client 114 begins in the Idle state 330 when the session set has been created. Session Manager client 114 transitions to the Out-of-Service state 332 as soon as a session is added, as indicated by arrow 334. Periodically, by setting and monitoring a Retry timer, Session Manager client 114 will attempt to bring the highest priority sessions to the In-Service state. Optionally, Session Manager client 114 will also periodically attempt to bring the lower priority sessions to the In-Service state.

When a session is connected, Session Manager client 114 then determines whether it should be the primary session based on the priority value associated with the current session. If so, Session Manager client 114 will make its session primary by passing a START message to the Session Manager server 112*a*, 112*b* on that session. Session Manager client 114 will remove the primary designation of a session by passing a STOP message to the Session Manager server 112*a*, 112*b* on that session.

Once one of the highest priority sessions has been designated as primary, Session Manager client 114 will transition to the In-Service state 336, as indicated by arrow 338. If a lower priority session has been designated as primary, Session Manager client 114 will move to the In-Service-Degraded state 340, as indicated by arrow 342.

If the primary session fails while In-Service, Session Manager client 114 will transition to the Switchover state 344, as indicated by arrow 346. Likewise, if the primary session fails while In-Service-Degraded 340, Session Manager client 114 will transition to the Switchover state 344, as indicated by arrow 354.

Figure 3C:
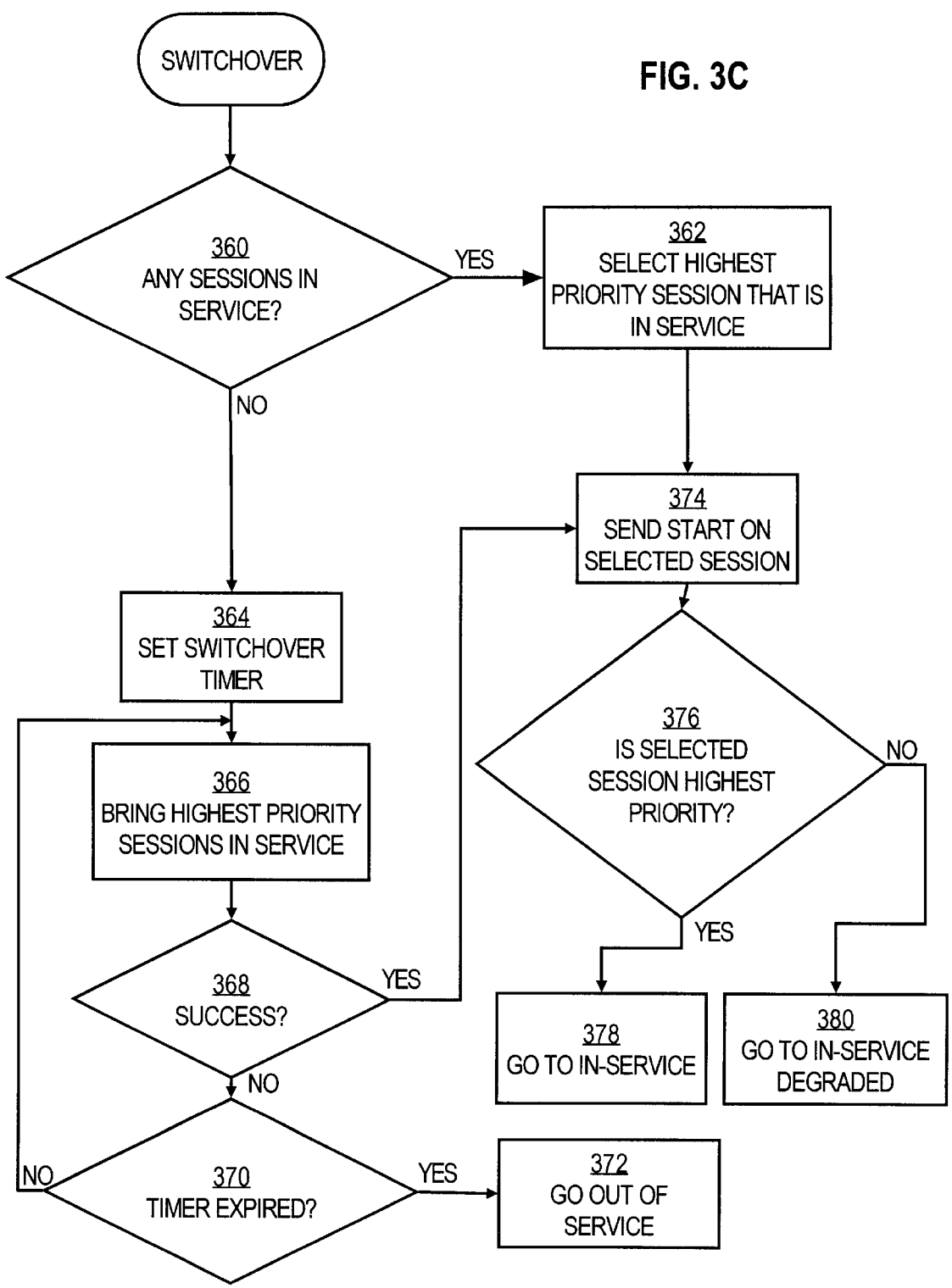
FIG. 3C is a flow diagram of a process of selecting a session for switchover.

FIG. 3C is a flow diagram of steps carried out by Session Manager client 114 when it is in the Switchover state 344. First, Session Manager client 114 will search for any session that is In-Service, as shown by block 360. If there are multiple high priority sessions, then block 360 may involve selecting the first high priority session, as depicted in block 362.

If there are no sessions that are In-Service, then Session Manager client 114 sets a switchover timer, as shown by block 364. Session Manager client 114 then attempts to bring all sessions In-Service in order of priority, as indicated by block 366. If a session is brought In Service, control passes to block 374, as indicated by block 368. If the switchover timer expires before a session is brought In Service, as shown by block 368 and block 370, Session Manager client 114 transitions to Out-of-Service state 332, as indicated by arrow 348 of FIG. 3B and block 372 of FIG. 3C.

Once Session Manager client 114 selects a session, it sends a START message on that session to cause it to transition to the Primary-In-Service state, as shown by block 374. Session Manager client 114 then transitions to the In-Service state 336 or In-Service-Degraded state 340 based on whether the session is of the highest priority, as indicated in FIG. 3B by arrow 350 and arrow 352, respectively, and as shown by block 376, block 378, and block 380 of FIG. 3C.

When Session Manager client 114 is running with a reliable transport layer protocol, it may initiate a session switchover to another session in a session group. In this configuration, Session Manager client 114 carries out the following steps.

a. Receive a Connection Fail signal from the transport layer, which indicates that the signal associated with the session has failed or disconnected.

b. Search for and find the highest priority session that is In-Service. If there are multiple high priority sessions, select the first high priority session.

c. If there are no sessions that are In-Service, set a switchover timer, and attempt to bring all sessions In-Service in order of priority. If the switchover timer expires, Session Manager client 114 transitions to Out-of-Service state 332, as indicated by arrow 348.

d. Once Session Manager client 114 selects a session, it sends a START message on that session to cause it to transition to the Primary-In-Service state. Session Manager client 114 then transitions to the In-Service state 336 or In-Service-Degraded state 340 based on whether the session is of the highest priority, as indicated by arrow 350 and arrow 352, respectively.

e. Receive an Connection Failed signal from the transport layer. If it is not received, Session Manager client 114 will initiate a state transfer from the failed session to the Primary-In-Service session using a function call of the transport layer. The transport layer is responsible for ensuring that the messages are re-transmitted and avoiding the transmission or reception of duplicate messages.

Steps (b.) through (d.) outlined above are generally similar to the process of FIG. 3C. A fuller understanding of steps (b.) through (d.) may be obtained by reference to FIG. 3C.

FAULT TOLERANT CONFIGURATION

1. GENERAL

The Session Manager may also operate in the fault tolerant configuration shown in FIG. 1B. In the Gateway 104, Session Manager client 114 manages selection and activation of the ACTIVE state or the STANDBY state for the signaling protocol application 208. In the Media Gateway Controller 102*a*, 102*b*, Session Manager servers 112*a*, 112*b* are informed by the signaling application about whether it is currently in the ACTIVE state or the STANDBY state.

The Session Manager elements operate in two distinct Primary In-Service states: Primary In-Service-ACTIVE and Primary In-Service-STANDBY. In the Primary In-Service-ACTIVE state, a session is In-Service, a START message has been transferred from Session Manager client 114 to Session Manager server 112*a*, and the Session Manager server has transferred an ACTIVE notification to the Session Manager client.

In the Primary In-Service-STANDBY state, a session is In-Service, a START message has been transferred from a Session Manager client to a Session Manager server, and the Session Manager server has transferred a STANDBY notification to the Session Manager client.

2. SERVER OPERATION

Figure 4A:
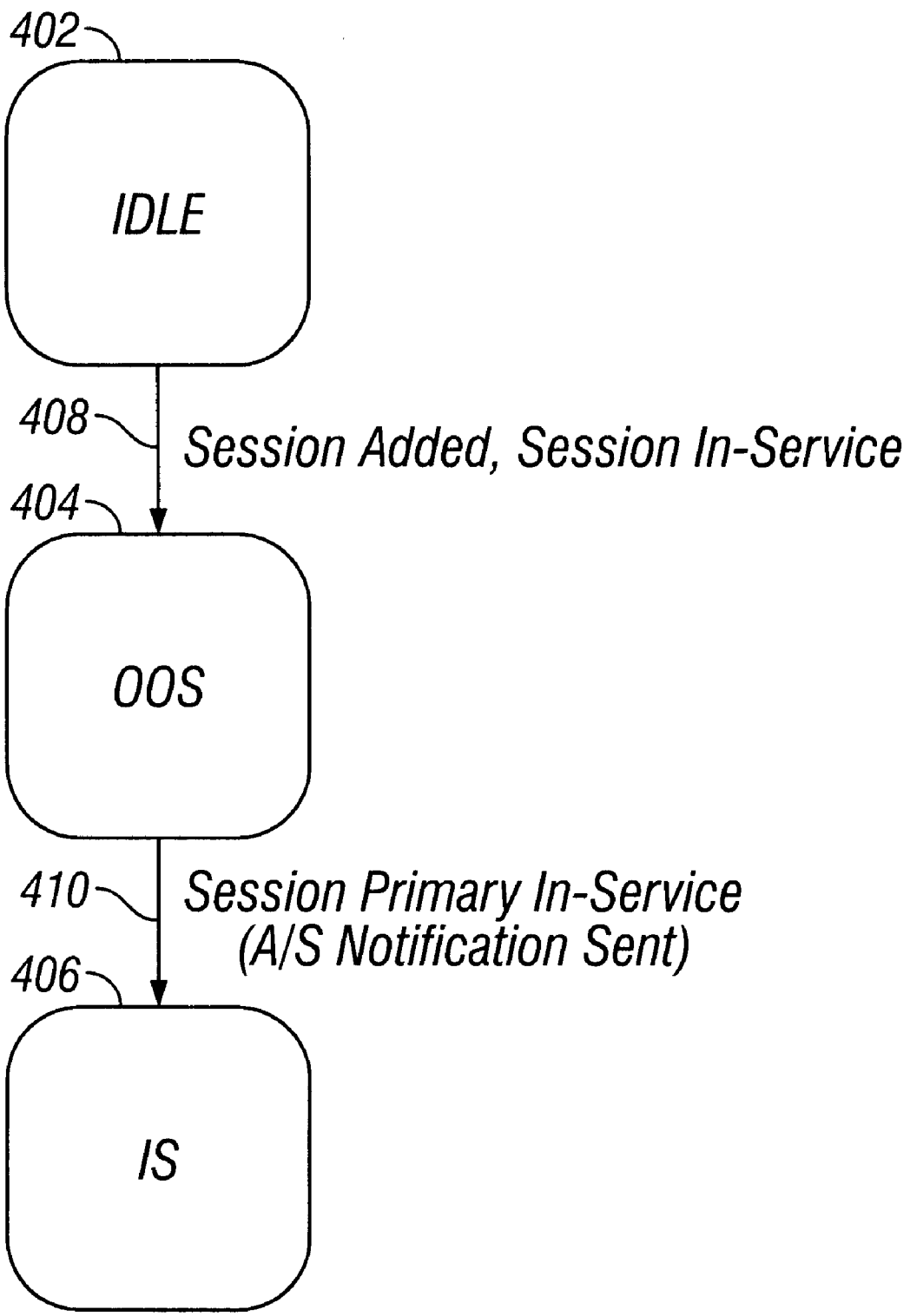
FIG. 4A is a state diagram of states in which a session manager server may operate when arranged in a fault tolerant configuration

FIG. 4A is a state diagram showing states in which Session Manager servers 112*a*, 112*b* may operate. The Session Manager servers 112a, 112b may function in one of three states: Idle state 402, Out-of-Service state 404, and In-Service state 406. In the Idle state 402, a session set has been created. In the Out-of-Service state 404, a session or sessions have been added to the session set, a session In-Service. In the In-Service state 406, a session is Primary In-Service and a message identifying the ACTIVE state or the STANDBY state has been sent.

In operation, Session Manager server 112a initializes to the Idle state 402 when a session set is created. When the session set is created, information indicating the initial ACTIVE/STANDBY state is passed as an argument to the Session Manager server 112a. After the session set has been created, the signaling application 208 can change the ACTIVE/STANDBY state at any time.

Session Manager server 112a moves to Out-of-Service state 404 when a session is created, as indicated by arrow 408. When a session transitions to the Primary In-Service state, it passes an ACTIVE or STANDBY message to the Session Manager server 112a. The Session Manager server 112a then transitions to the In-Service state 406, as indicated by arrow 410.

The Session Manager server 112a periodically sends a value identifying its state (ACTIVE/STANDBY) to the application 208 and to the Session Manager client 114. In the preferred embodiment, the Session Manager server 112a sets a state timer, sends its state value when the timer expires, and resets the timer.

3. CLIENT OPERATION

Figure 4B:
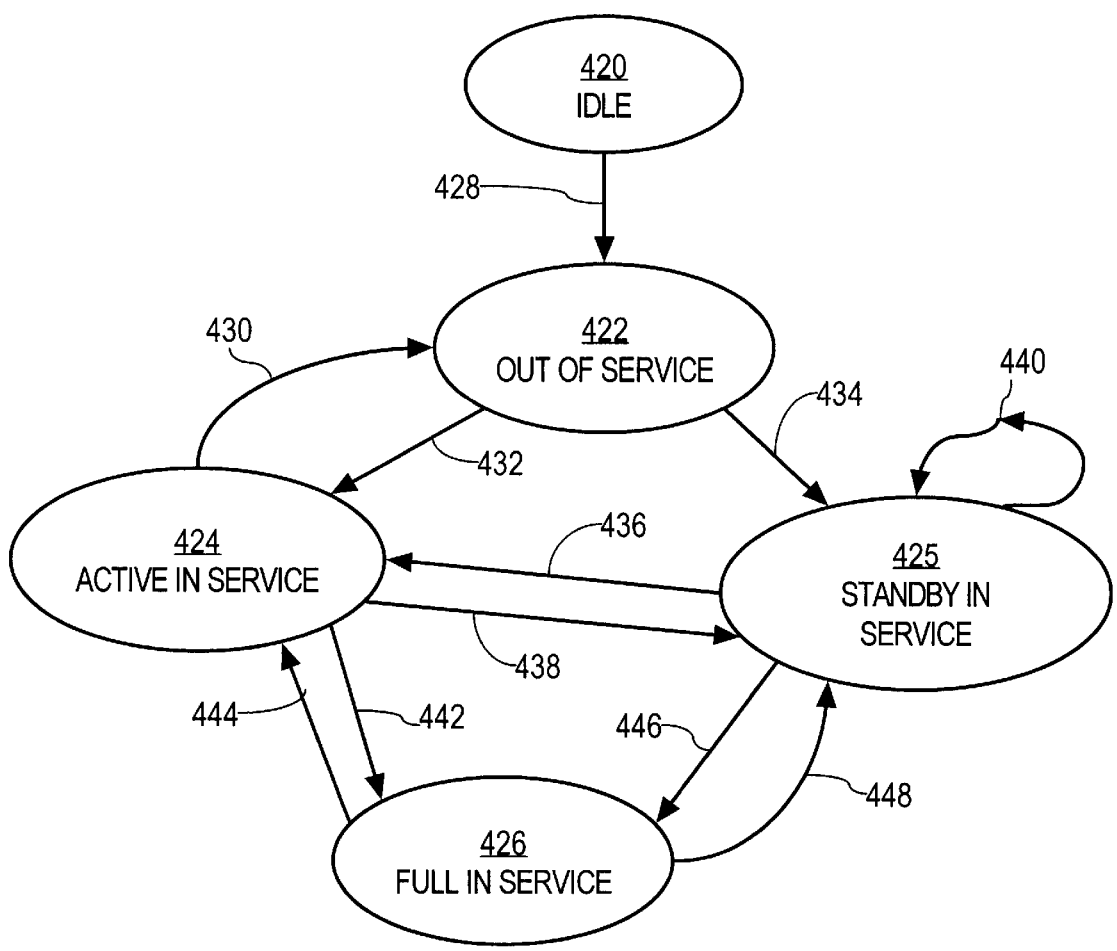
FIG. 4B is a state diagram of states in which a session manager client may operate when arranged in a fault tolerant configuration.

FIG. 4B is a state diagram of states in which the Session Manager client 114 may operate. Session Manager client 114 acts on ACTIVE/STANDBY indications from each server. Session Manager client 114 may operate in any of five (5) states: Idle state 420; Out-of-Service state 422; Active-In-Service state 424; Standby-In-Service state 425; and Full-In-Service state 426.

In Idle state 420, a session has been created.

In Out-of-Service state 422, one or more sessions have been added to the session group, but currently, no ACTIVE notification has been received from the Media Gateway Controller. Thus, the session cannot begin passing traffic to either Media Gateway Controller 102a, 102b.

In the Active-In-Service state 424, an ACTIVE notification has been received over one In-Service session, but STANDBY notification has not been received on any available In-Service session(s). In the Standby-In-Service state 425, a STANDBY notification is received, but there is no In-Service Active session available. In the Full-In-Service state 426, a session has ACTIVE notification, and at least one session has STANDBY notification.

In operation, as shown in FIG. 4B, the Session Manager client 114 initializes to Idle state 420 a session is created. The Session Manager client 114 moves to the Out-of-Service state 422 when a session is added, as indicated by arrow 428, and then waits for an ACTIVE notification or a STANDBY notification from a Session Manager server 112a or 112b. If the notification is ACTIVE, then Session Manager client 114 moves to the Active In Service state 424, as indicated by arrow 432, and informs all applications using the current session that the current session status is "UP". If the notification is STANDBY, then Session Manager Client 114 moves to the Standby In Service state 425, as shown by, arrow 434. The session that the ACTIVE notification is received on will be called the Active session. The session that the STANDBY notifcation is received on will be called the Standby session.

If Session Manager Client 114 is in the Active In Service state 424, the Session Manager client transitions to the Full In Service state 426 when a STANDBY notification is received on any session other than the Active session. If Session Manager Client 114 receives a STANDBY notification on the Active session, it will then transition to the Standby In Service state 425, as shown by arrow 438.

If Session Manager Client 114 is in the Standby In Service state 425, it transitions to the Full In Service state 426 if the ACTIVE notification is received on a session(s) other than the Standby session, as shown by arrow 446. If the Session Manager Client 114 receives an ACTIVE notification on the Standby session, it transitions to the Active In Service state 424, as shown by arrow 436.

If the Session Manager Client 114 is in the Full In Service state 426, it moves to the Active In Service state 424 if the Standby session fails, as shown by arrow 444. If the Session Manager Client 114 is in the Full In Service state 426, it moves to the Standby In Service state 425 if the Active session fails, as shown by arrow 448.

4. SESSION QUEUING

In the fault tolerant configuration, there is a need to be able to save or hold messages of an application program on the client side while the Media Gateway Controller is in the process of failover or switchover to a second or back-up session. This need may be fulfilled by providing a message queue at the Gateway and a way for the Session Manager to notify the Gateway to start using the queue.

Referring again to FIG. 1B, in an embodiment, each Session Manager Client 114 creates one or more queues 115 at the Gateway 104 when the Session Manager Client initializes. Each queue stores one or more messages that the Gateway 104 wishes to send to the currently active Media Gateway Controllers 102a, 102b. Each queue has a status flag or condition value associated with it. The condition value may be set to Hold or Clear. The Hold condition indicates that the queue is actively being used to store or hold messages. The Clear condition indicates that the queue is disabled and not being used. Each queue is associated with a session. Each queue stores messages that an application program is communicating using the session.

Figure 4C:
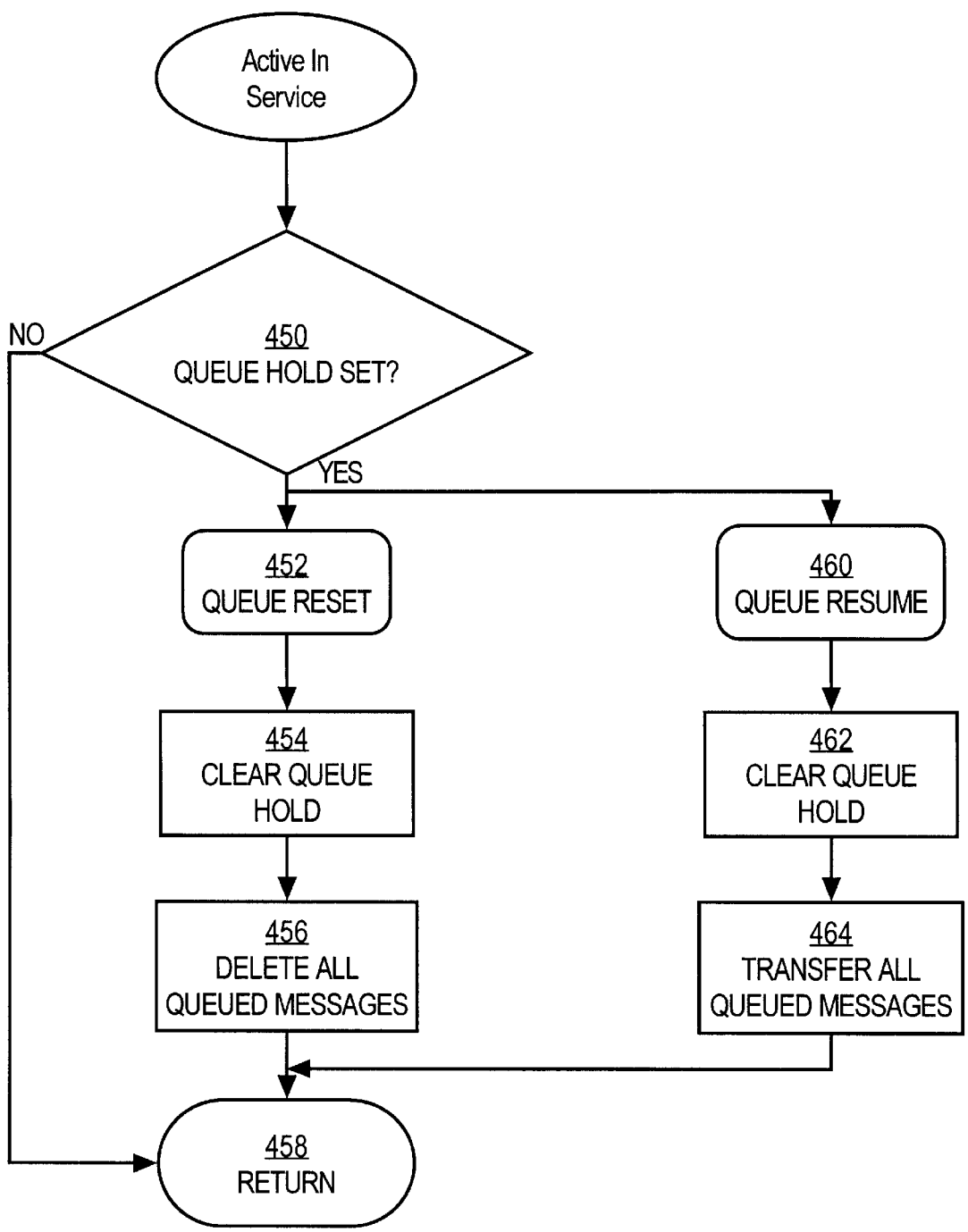
FIG. 4C is a flow diagram of a process of message queuing.
Figure 4D:
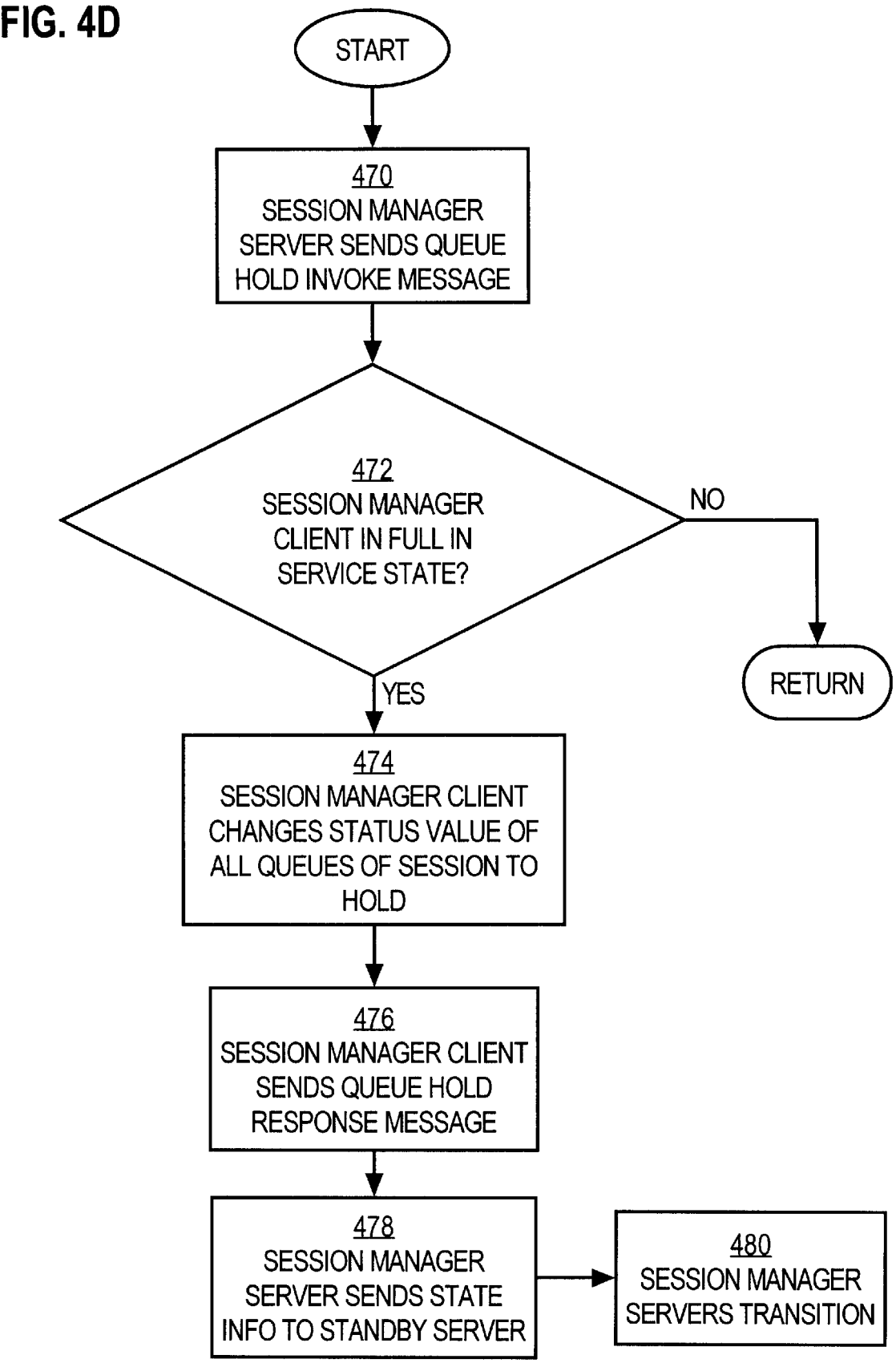
FIG. 4D is a flow diagram of requesting and acknowledging message queuing.

FIG. 4C is a flow diagram of a process of requesting and acknowledging message queuing. In the preferred embodiment, the Session Manager Server 112a of Active Media Gateway Controller 102a requests the Gateway 104 to queue messages by sending a Queue Hold Invoke message, as shown in block 470. Responsive action is taken by Session Manager Client 114 only if it is in the Full In Service state, as shown by block 472. If it is, then Session Manager Client 114 changes the status value of all queues associated with the current session to Hold, as shown by block 474.

When the Session Manager Client 114 is in the Full In Service state, and receives the Queue Hold Invoke message, then the Session Manager Client stays in the same state, but sets the status or condition of all queues associated with the current session to Queue Hold. Once the Queue Hold condition is set for a queue, the condition remains set until it is cleared in response to a Queue Resume Invoke message or in response to a Queue Reset Invoke message. The Queue Hold condition is not re-set or changed when the Session Manager Client 114 carries out a state transition.

The Session Manager Client 114 of Gateway 104 acknowledges the queue request by sending back a Queue Hold Response message, as shown by block 476. Then, the Media Gateway Controller 102a, may freeze its state, and transfer the state information to the Standby Media Gateway Controller 102b, as shown by block 478. Thereafter, the Media Gateway Controllers 102a, 102b carry out state transitions in which the Standby Media Gateway Controller 102*b* becomes Active, as indicated by block 480. Switchover is accomplished.

When the switchover process is complete, the Media Gateway Controller 102*b* sends a Queue Resume Invoke message to the Gateway 104 to request that the Gateway resume sending the queued messages to the Media Gateway Controller 102*b*, which is at that time the Active Media Gateway Controller. A Media Gateway Controller may request the Gateway to delete or clear all queued messages by sending a Queue Reset message. Normally the Queue Reset message is sent after the Media Gateway Controller 102*b* has received all the queued messages from the Gateway 104.

FIG. 4B is a flow diagram that illustrates the responsive action taken by Session Manager Client 114 after activating its queues and sending the Hold response message that are described above in connection with block 474 and block 476. The Session Manager Client 114 must be in the Active In Service state.

If the Queue Hold condition is not set, then the Session Manager Client 114 ignores any Queue Reset Invoke message or Queue Resume message that is received, as shown by block 450 and block 458.

When the Session Manager Client 114 is in the Active In Service state, and receives the Queue Reset invoke message, then the Session Manager Client will clear the Queue Hold condition of all queues associated with the current session, as shown by block 452 and block 454. Any queued messages are deleted, as shown by block 456.

If the Queue Resume message is received when the Session Manager Client is in the Active In Service State, then the Queue Hold condition of all queues associated with the current session is cleared, as shown by block 460 and block 462, and all queued messages are transferred over the current session to the Session Manager Server, as shown by block 464.

The Session Manager Client 114 also ignores any Queue Reset Invoke message or Queue Resume message that is received when the Session Manager Client is any state other than Idle or Out Of Service.

TIMERS, COUNTERS, STATISTICS

1. TIMERS

In the foregoing description, certain elements are described as operating in connection with one or more timers. Each timer may be implemented as a software or hardware element that is set, runs independently, and may be queried to determine whether a particular expiration value is reached. Alternatively, each timer may operate as a separate process that can interrupt the operation of a process that sets or uses the timer.

In a preferred embodiment, the following timers are created, stored and used.

sm_retry_timer—used to retry connection of Out-of-Service sessions. The default time period is 5 seconds.

sm_switchover_timer—defines the amount of time allowed for a switchover to another session before transitioning to Out-of-Service state. The default period is 3 seconds.

sm_failover_timer—defines the amount of time allowed for a failover, including notification of an ACTIVE Media Gateway Controller, before transitioning to the Out-of-Service state. The default period is 3 seconds.

sm_state_timer—used by Session Manager server in fault tolerant configuration. The Session Manager server sends a value indicating its state (either ACTIVE or STANDBY) periodically based on this timer. The default period is 60 seconds.

2. SESSION MANAGER COUNTERS

In the foregoing description, certain elements are described as operating in connection with one or more counters. Each counter may be implemented as a software or hardware element that is initialized, increments continuously upon a defined event unless re-initialized, and may be queried to determine its current value. In a preferred embodiment, the following timers are created, stored and used:

A counter called "sm_unstable_session" is used as the basis for triggering an alarm. The counter counts session recoveries. If 20 session recoveries occur in a time period of 60 minutes or less, the system is determined to be unstable and an alarm is triggered.

3. SESSION MANAGER STATISTICS

In a preferred embodiment, Session Manager server 112*a* or Session Manager client 114 create and store statistical information. Preferably, the statistics are maintained on a session and session set basis. The application 208 may query and clear the statistics. The statistics may be stored in one or more files in non-volatile storage, or in memory.

In one embodiment, Session Manager creates and stores, for each session and for each session set, values that identify: number of bytes transmitted; number of PDUs transmitted; number of bytes received; and the number of PDUs received. Preferably, Session Manager creates and stores, only for each session group, values that identify the number of session switchovers. In the fault tolerant configuration, Session Manager creates and stores the number of failovers for each session set.

HARDWARE AND SOFTWARE OVERVIEW

1. GATEWAY

Gateway 104 may be implemented using appropriate software elements executed by a router, such as the Cisco 2600 Series Routers commercially available from Cisco Systems, Inc. Detailed information about these products is available online at: http://www.cisco.com/warp/public/728/2600/2600 ov.htm

2. MEDIA GATEWAY CONTROLLER

Media gateway controller may be implemented using appropriate software elements executed by a protocol converter. An example of a suitable protocol converter is the Cisco SC2200 Signaling Converter, commercially available from Cisco Systems, Inc. Other examples of such a system are described in the Protocol Converter Disclosure identified above, the entire contents of which are hereby incorporated by reference as if fully set forth herein.

SCOPE

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1

Reliable UDP—RUDP

Functional Specification

Project Headline

RUDP is a lightweight protocol layer designed to run on top of UDP can provide reliable in-order delivery. It can be used to transport telecommunication signaling protocols across IP networks.

1.0 Functional Overview

System Overview

RUDP is a simple packet based transport protocol. RUDP is based on RFCs 1151 and 908—Reliable Data Protocol. RUDP is layered on the UDP/IP Protocols and provides reliable in-order delivery (up to a maximum number of retransmissions) for virtual connections. RUDP has a very flexible design that would make it suitable for a variety of transport uses. One such use would be to transport telecommunication signaling protocols.

Background

A reliable transport protocol is needed to transport of telephony signaling across IP networks. This reliable transport MUST be able to provide an architecture for a variety of internal signaling/network protocols running on IP.

Existing IP protocols have been scrutinized and it has been concluded that a new reliable transport mechanism for telecommunication signaling protocols is needed. TCP/IP has a number of characteristics that make it unsuitable for transporting signaling protocols.

- TCP/IP is a byte-stream protocol; signaling transport requires a message based protocol.
- TCP/IP has a relatively high overhead.
- TCP/IP timers are not compatible with the timing requirements of signal transport.
- TCP/IP congestion control mechanisms are incompatible with the timing requirements of signal transport.
- Most TCP/IP implementations that allow properties like timers to be modified, do not allow the modification to be done on a per-connection basis. RUDP is designed to allow characteristics of each connection to be individually configured so that many protocols with different transport requirements can be implemented simultaneously on the same platform.
- The complex connection-oriented protocol state machines in TCP become unnecessary overhead for a simple request/response exchange between a client application and a server application, especially in communication environments such as signaling.
- Since TCP does not allow a byte to be acknowledged until all prior bytes have been acknowledged, it often forces unnecessary retransmission of data.

Data Structure Format

1. Six Octet Minimum RUDP Header for Data Transmissions

Each UDP packet sent by RUDP starts with at least a six octet header. The first octet contains a series of single bit flags. The next three fields are each one octet in size. They are: Header length, Sequence number, and Acknowledgment number. These three octets are followed by a variable length header area. Finally, there is a two octet header checksum.

FIG. 1, RUDP Header

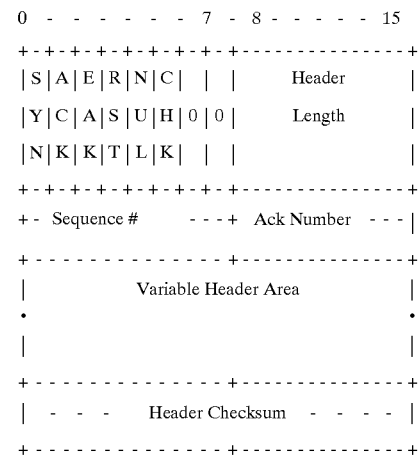

Control Bits

The control bits indicate what is present in the packet. The SYN bit indicate a synchronization segment is present. The ACK bit indicates the acknowledgment number in the header is valid. The EAK bit indicates an extended acknowledge segment is present. The RST bit indicates packet is a reset segment. The NUL bit indicates packet is a null segment. The SYN, EAK, and RST bits are mutually exclusive. The ACK bit is always set when the NUL bit is set. The CHK bit indicates last two octets of the Variable Header area contains a checksum of the user data.

Header Length.

The Header length field indicates where user data begins in the packet. If total length of the packet is greater than the value of the header length field, user data exists in the packet. User data cannot be present in packets with the EAK, NULL, or RST bits set. A packet with user data in it always has the ACK bit set and is called a data segment.

Sequence Number.

Each packet contains a sequence number. When a connection is first opened, the each peer randomly picks an initial sequence number. This sequence number is used in the SYN segments to open the connection. Each transmitter increments the sequence number before sending a data, null, or reset segment. Each time a transmitter sends a data, null, or reset segment.

Acknowledgment Number.

The acknowledgment number field indicates to a transmitted that last in-sequence packet the receiver has received.

Variable Header Area.

The variable header area is used to store non-user information.

2. SYN Segment

The SYN is used to establish a connection and synchronize sequence numbers between two hosts. The SYN segment also contains the negotiable parameters of the connection. All configurable parameter that the peer must know about are contained in this segment. This includes the maximum number of segments the local RUDP is willing to accept and option flags that indicate the features of the of the connection being established. A SYN segment has a variable header length and can not be combined with user data. A SYN segment is also used to perform an auto reset on a connection.

FIG. 2, SYN segment

```
 0 - - - - - - - 7 - 8 - - - - - 15
+-+-+-+-+-+-+-+-+-+-+---------------+
|1|0|0|0|0|0|0|0|0|   Header Length |
+-+-+-+-+-+-+-+-+-+-+---------------+
+ -   Sequence #    - - -+  Ack Number  - - -|
+----------------+----------------+
|   Vers   - |  Spare   |   Max # of Out-    |
|  - - - - - - - - - - - - - |  standing Segs    |
+----------------+----------------+
|   Option Flags       - | - - - -  Spare  - - - |
+----------------+----------------+
+ - -    Maximum Segment Size    - - -|
+----------------+----------------+
+       Retransmission Timeout Value      - |
+----------------+----------------+
+       Cumulative Ack Timeout Value      - |
+----------------+----------------+
+ -    Null Segment Timeout Value      - |
+----------------+----------------+
+       Transfer State Timeout Value      - |
+----------------+----------------+
| -    Max Retrans     - |   Max Cum Ack  - |
+----------------+----------------+
|     Max Out of Seq        |   Max EAK Count  |
+----------------+----------------+
|     Max Auto Reset        |   Spare  - - - - |
+----------------+----------------+
| -     Connection Identifier       - - - -|
| -     (32 bits in length)         - - - - -|
+----------------+----------------+
+ - - - -    Header Checksum    - - - |
+----------------+----------------+
```

Sequence Number

The sequence number field contains the initial sequence number selected for this connection.

Acknowledgment Number

This field is valid only if the ACK flag is set. In that case, this field will contain the sequence number of the SYN segment received from the other RUDP.

Version

The version field contains the version of RUDP. The version currently implemented between the VSC and Nomad is designated 0, The version being specified in rev D. of this document is version 1.

Maximum Number of Outstanding Segments

The maximum number of segments that should be sent without getting an acknowledgment. This is used by the receiver as a means of flow control. The number is selected during connection initiation and may not be changed later in the life of the connection. This is not a negotiable parameter. Each side must use the value provided by its peer when sending data.

Options Flag Field

This field of two octets contains a set of options flags that specify the set of optional functions that are desired for this connection. A preliminary subset of flags are defined as follows:

| Bit # | Bit Name | Description |
|---|---|---|
| 0 | not used | not used, always set to 1. |
| 1 | CHK | Data Checksum enable. If this bit is set then the last two octets of each header preceding a data segment will contain a checksum of the data segment This is a negotiable parameter. |
| 2 | REUSE | This bit set during an auto reset to indicate the previous negotiable parameters should be used. When this bit is set the following fields are absent from the SYN segment: Maximum Segment Size, Retransmission Timeout Value, Cumulative Ack Timeout Value, Max Retrans, Max Cum Ack, Max Out of Seq, and Max EAK Count. |
| 3–7 | Spare | |

Maximum Segment Size

The maximum number of octets that can be received by the peer sending the SYN segment. Each peer MAY specify a different value. Each peer MUST not send packets greater than the value of this field received from its peer during connection negotiation. This number includes the size of the RUDP header. This is not a negotiable parameter.

Retransmission Timeout Value

The timeout value for retransmission of unacknowledged packets. This value is specified in milliseconds. The valid range is 100 to 65536. This is a negotiable parameter, both peers must agree on the same value for this parameter.

Cumulative Ack Timeout Value

The timeout value for sending an acknowledgment segment if another segment is not sent. This value is specified in milliseconds. The valid range is 100 to 65536. This is a negotiable parameter, both peers must agree on the same value for this parameter. In addition, this parameter should be smaller than the Retransmission Timeout Value.

Null Segment Timeout Value

The timeout value for sending a null segment if a data segment has not been sent. This value is specified in milliseconds. The valid range is 100 to 65536. This is a negotiable parameter, both peers must agree on the same value for this parameter.

Transfer State Timeout Value

This timeout value indicate the amount of time the state information will be saved for a connection after an auto reset occurs. This value is specified in milliseconds. The valid range is 100 to 65536. This is a negotiable parameter, both peers must agree on the same value for this parameter.

Max Retrans

The maximum number of times consecutive retransmission will be attempted before the connection is considered broken. The valid range for this value is 0 to 255. A value of 0 indicates retransmission should be attempted forever. This is a negotiable parameter, both peers must agree on the same value for this parameter.

Max Cum Ack

The maximum number of acknowledgments that will be accumulated before sending an acknowledgment if another segment is not sent. The valid range for this value is 0 to 255. A value of 0 indicates an acknowledgment segment will be send immediately when a data, null, or reset segment is received. This is a negotiable parameter, both peers must agree on the same value for this parameter.

Max Out of Seq

The maximum number of out of sequence packets that will be accumulated before an EAK segment is sent. The valid range for this value is 0 to 255. A value of 0 indicates an EAK will be sent immediately if an out of order segment is received. This is a negotiable parameter, both peers must agree on the same value for this parameter.

Max EAK Count

The maximum number of EAK segments that will be sent for a particular set of missing segments before the connection is considered broken. The valid range for this value is 1 to 255. A value of 1 indicates that if missing segments are not received after the first EAK is sent, that connection will be considered broken. This is a negotiable parameter, both peers must agree on the same value for this parameter.

Max Auto Reset

The maximum number of consecutive auto reset that will performed before a connection is reset.

The valid range for this value is 0 to 255. A value of 0 indicates that an auto reset will not be attempted, the connection will be reset immediately if an auto reset condition occurs. This is a negotiable parameter, both peers must agree on the same value for this parameter.

Connection Identifier

When opening a new connection each peer transmits a connection identifier that is unique among all RUDP current connections. Each side then saves the connection ID received. When an auto reset is performed, the peer shall send the saved connection ID originally received to indicate that an auto reset is being performed on the connection. If a SYN is received with a different connection ID, it is an indication that the state of another connection is being transferred.

3. ACK Segment

The ACK Segment is used to acknowledge in-sequence segments. It contains both the next send sequence number and the acknowledgment sequence number in the RUDP header. The ACK segment may be sent as a separate segment, but it should be combined with data whenever possible. Data and Null segments must always include the ACK bit and Acknowledgment Number field. The size of a stand-alone ACK segment is 4 octets.

FIG. 3, Stand-alone ACK segment

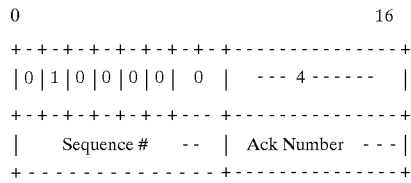

4. EACK Segment

The EACK segment is used to acknowledge segments received out of sequence. It contains the sequence numbers of one or more segments received out of sequence. The EACK is always combined with an ACK in the segment, giving the sequence number of the last segment received in sequence. The header length is variable for the EACK segment. Its minimum value is 5 and its maximum value depends on the maximum receive queue length. The EACK segment may also include user data.

FIG. 4, EACK segment

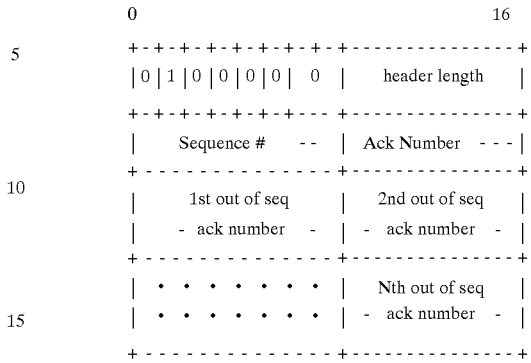

5. RST Segment

The RST segment is used to close or reset a connection. Upon receipt of an RST segment, the sender must stop sending new packets, but must continue to attempt delivery of packets already accepted from the API. The RST is sent as a separate segment and does not include any data.

6. NUL Segment

The NUL segment is used to determine if the other side of a connection is still active. When a NUL segment is received, an RUDP implementation must acknowledge the segment if a valid connection exists and the segment sequence number falls within the acceptance window. The segment is then discarded. The NUL may be combined with an ACK in a segment but is never combined with user data.

Feature Description

The following features are supported by RUDP. In the following description, transmitter and receiver refer to either clients or servers that are sending or receiving a data segment respectively on a connection. Client refers to the peer that initiates the connection and Server refers to the peer that listened for a connection. A connection is defined as an interface that serves a unique peer IP address/UDP port pair. A server or a client can have multiple connections on a particular IP address/UDP port, each connection will be with a unique peer IP address/UDP port pair.

Retransmission Timer.

The transmitter will have a retransmission timer with a configurable time-out value. This timer will be initialized every time a data, null, or reset segment is sent and there is not a segment currently being timed. If an acknowledgment for this data segment is not received by the time the timer expires, all segments that have been sent but not acknowledged are retransmitted. The time-out value can be configured to a fixed value or allowed to adjust dynamically based on the calculated round trip time. The Retransmission timer is also started if when the timed segment is received, there is still one or more packets that have been sent but not acknowledged.

Retransmission Counter.

The transmitter will maintain a counter of the number of times a segment has been retransmitted. The maximum value of this counter is configurable with a recommended value is 2. If this counter exceeds its maximum, the transmitter will perform a auto reset on the connection and notify the Upper Layer Protocol (ULP) via the API.

Stand-alone Acknowledgments.

A stand-alone acknowledgment segment is a segment that contains only acknowledgment information. It sequence number field contains the sequence number of the last data, null, or reset segment sent. Its Piggyback Acknowledgments.

Whenever a receiver sends a data segment to the transmitter, it will include the sequence number of the last in-sequence data, null, or reset segment received from the transmitter in the acknowledgment number field of its header.

Cumulative Acknowledge Counter.

The receiver will maintain a counter of unacknowledged in-sequence data, null, or reset segments received without a data, null or reset segment being sent to the transmitter. The maximum value of this counter is configurable. If this counter's maximum is exceeded, the receiver will send a stand-alone acknowledgment to the transmitter.

Cumulative Acknowledge Timer.

When a receiver has data, null, or reset segments that it has not acknowledged, it will wait a maximum amount of time before sending a stand-alone acknowledgment. The cumulative acknowledge timer is started whenever a valid data, null, or reset segment is received and the Cumulative acknowledge timer is not already running. When this timer expires the last in-sequence data, null, or reset segment is acknowledged. The time-out value is configurable.

Out-of-sequence Acknowledgments Counter.

The receiver maintains a counter of the number of data, null, or reset segments that have arrived after receiving an out-of-sequence data or null segment. If this counter exceeds its configurable maximum, an extended acknowledgment segment containing the sequence numbers of the out-of-sequence data, null, and reset segments that have been received will be sent to the transmitter. When a transmitter receives an Extended Acknowledgment, it will retransmit the missing data segments to the receiver. The receiver will also send an extended acknowledgment segment instead of a stand-alone acknowledgment segment, if the cumulative acknowledge timer expires and the receiver has received out-of-sequence data segments.

Extended Acknowledgment Counter.

The receiver will maintain a counter of the number of times an extended acknowledgment segment has been sent for a set of segments. If this counter exceeds a configurable maximum, the receiver will perform an auto reset on the connection.

Null Segment Timer and Counter.

The client maintains a timer which started when the connection is opened and is reset every time a data segment is sent. If the client's null segment timer expires, the client will send a null segment to the server. The null segment will be acknowledged by the server if its sequence number is valid. The server maintains a null segment timer with a time-out value of twice the client's time-out value. The server's timer is reset whenever a data or null segment is received from the client. The server increments its null segment counter whenever its null segment timer expires. If the null segment timer exceeds its maximum value, an auto reset is initiated. The time-out value and maximum count are configurable. Keep-alives can be disabled by setting the time-out value to 0.

Auto Reset (Formally Known as Soft Reset)

Either side of a connection can initiate an auto reset, as described above. An auto reset will cause both peers to save their current states including retransmission and out-of-sequence queues and then reset their initial sequence number and re-negotiate the connection. Each peer will notify its ULP of the auto reset, via the API. The ULP can then transfer the state to other idle connection to the same host. The transfer will preserve the state and queues such that not segments are lost or duplicated. The ULP can also choose to ignore the auto reset if it does not have a duplicate connection or can tolerate loss of data.

Receiver Input Queue Size

The size of the receiver's input queue is configurable parameter. The default size is 8 packets.

Congestion Control and Slow Start

RUDP does not provide any congestion control or slow start algorithms.

UDP Port Numbers

RUDP does place any restrictions on which UDP port numbers are used. Valid port numbers are ports not defined in RFC 1700 nor used by Cisco internally.

Support Redundant Links

If an RUDP connection fails, The ULP will be signaled and the current connection state will be saved. The ULP can initiate the transfer of this state to another connection and RUDP will transfer a the state information to the new connection ensuring that packets are not duplicated or lost. If the ULP does not transfer the state to another connection before the Transfer State Timer expires, the connection state will be lost and buffers on the saved queues will be freed. The timeout value for the Transfer State timer is configurable.

FEC

RUDP does not provide Forward Error Correction (FEC).

Security

RUDP will be compatible with the IPsec standard for secure IP communications.

Future Planned Enhancements

RUDP shall support a symmetrical mode of operation in addition to the current client/server mode of operation. This will allow both sides to actively start the connection.

RUDP shall support the ability to expand the sequence and acknowledge fields from their current one octet length to two octets. This will allow transmission windows of greater than 255 buffer to be used.

Feature Negotiation

When client initiates a connection its sends a SYN segment which contains the negotiable parameters defined by the ULP via the API. The server can accept these parameters by echoing them back in its SYN message or propose different parameters in its SYN response. The client can then choose to accept the parameters send by the server by sending an ACK to establish the connection or it can send a RST to refuse the connection.

Application Programmer Interface

The Application Programmer Interface (API) for RUDP will provide the following services:

Open and Configure connection. Open an active connection to a peer or a passive connection waiting for a peer. Configure connection parameters.

Close connection. Close a connection to an active or passive connection.

Accept connection. Accept a connection from a peer on a passive connection.

Asynchronous connection status notification. Notify user or upper layer protocol of asynchronous events relating to a connection.

Connection status query. Query the current status of a connection.

Connection Control. Affect the control behavior of a connection, such as the transfer of state information between connections.

The details of the API are dependent on the platform.

Features Not Addressed

The major requirements are that RUDP must run on UDP and be a very simple protocol. There are no requirements not addressed.

Management Considerations

CLI

A set of 5–10 commands will be developed for the CLI including the following.

Query Status of connection—or dump all of RUDP connections.

Configuration of the Retransmission timer and maximum Retransmission count.

Configuration of the Cumulative Acknowledge timer and maximum Cumulative Acknowledge count.

Configuration of the maximum Out-of-sequence Acknowledgment count

Configuration of the maximum Extended Acknowledgment count.

Configuration of the Null segment timer.

MIB

A MIB is planned in the future to supplement the UDP and IP MIBs already available from the operating system. Currently the following statistics are tracked on a per connection basis and are available via the API:

Number of Unacknowledged data segments

Number of packet received on a connection pending delivery to the application

Number of auto resets on the connection

Total number of packets sent

Total number of packets received

Current calculated round trip time (if enabled)

Maximum number of unacknowledged packets that can be sent

In addition to the above, the MIB will contain the negotiable parameters for each connection, the default parameters, the number of retransmissions detected per connections, and the lifetime of the connections. Information on closed connections shall be maintained and aged. The oldest connection information will be discard if the queue of old connections is full and another connection closes.

MANAGEMENT APPLICATIONS

No management application is needed, each application will specify RUDP for transport and have their own configurations.

Testability Considerations

Diagnostics—measurements of out of sequence, retransmitted or dropped data segments. RUDP will run on Private Networks that are engineered for small delays and minimum hops. References: RFC-908 Reliable Data Protocol; RFC-1151Reliable Data Protocol.

That is claimed is:

1. A method of providing continuous voice and call communications between a data network and a telephony network, the method comprising the steps of:

establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

initializing to an idle state;

in response to creation of a session of the first and second sessions, entering an out of service state;

when a session of the first and second sessions becomes the primary in service session, entering an in service state; and when the primary in service session fails, switching over the communications from the primary in service session to the other session of the first and second sessions while maintaining the voice and call communications and while ensuring that all messages generated by the gateway are sent to the gateway controller.

2. The method recited in claim 1, wherein the session manager server executes in a logical layer below a signal processing application and above a reliable transport layer.

3. The method recited in claim 1, further comprising the steps of:

when the first session fails, entering a recovery state;

starting a timer set to a predetermined time value; and returning to the in service state if the first session is restored as the primary session before the timer expires.

4. The method recited in claim 3, further comprising the step of:

remaining in the recovery state if another session is created when in the recovery state.

5. The method recited in claim 3, further comprising the step of:

entering the out of service state if the timer expires and the first session has not been restored as the primary session.

6. The method recited in claim 1, further comprising the steps of:

establishing the first session and the second session between a second gateway controller and the gateway;

providing a second session manager server in the second gateway controller; and in each of the session manager servers:

initially operating in an idle state;

entering an out of service state from the idle state when the first session is added and becomes in service; and entering an in service state when the first session becomes the primary in service session.

7. The method recited in claim 6, further comprising the step of notifying the session manager client that the session manager server is active.

8. The method recited in claim 6, further comprising the steps of:

in the session manager client:

initially operating in an idle session state;

entering an out of service state from the idle session state when a session becomes available;

entering an active in service state from the out of service state when an Active notification is received over the first session and when no Standby notification has been received over any session.

9. The method recited in claim 8, further comprising the step of:

entering a standby in service state from the out of service state when a Standby notification is received and when no Active in service session is available.

10. The method recited in claim 8, further comprising the step of:

entering a full in service state from the out of service state upon receiving notifications that the first session is Active and that the second session is Standby.

11. The method recited in claim 10, further comprising the step of:

entering a switchover state from the full in service state upon receiving notification that the second session is Active and no other in service Standby sessions are available.

12. The method recited in claim 1, wherein the session manager client determines whether either of the first and second sessions should be the primary in service session.

13. A method of providing continuous voice and call communications between a data network and a telephony network, the method comprising the steps of:
    establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;
    storing a priority value in association with each session;
    wherein the session manager server and the session manager client initialize to an idle state;
        in response to creation of a session of the first and second sessions, enter an out of service state;
        enter an in service state from the out of service state when the session having the highest priority value becomes the primary in service session;
        enter a switchover state from the in service state when the primary in service session fails;
    wherein the session manager client
        enters a degraded state from the switchover state when another session having a lower priority value becomes the primary in service session; and
    when the primary in service session fails, switching over the communications from the primary in service session to the other session of the first and second sessions while maintaining the voice and call communications and while ensuring that all messages generated by the gateway are sent to the gateway controller.

14. The method recited in claim 13, further comprising the step of re-entering the in service state from the switchover state when the session having the highest priority again becomes the primary in service session.

15. The method recited in claim 13, further comprising the step of re-entering the switchover state from the degraded state when the session having the highest priority again becomes the primary in service session.

16. The method recited in claim 13, further comprising the steps of:
    starting a switchover timer that is set to a pre-determined time value; and
    entering the out of service state from the switchover state when no session becomes the primary in service session before the switchover timer expires.

17. The method recited in claim 16, further comprising the steps of:
    accumulating a switchover-failure counter each time that the out of service state is entered from the switchover state;
    entering an unstable state when the switchover-failure counter is equal to a pre-determined count.

18. The method recited in claim 13, further comprising the step of entering the degraded state from the out of service state when a session having a priority value that is less than the highest priority value becomes the primary in service session.

19. A method of providing continuous voice and call communications between a data network and a telephony network, the method comprising the steps of:
    establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;
    establishing the first session and the second session between a second gateway controller and the gateway, wherein the second gateway controller includes a second session manager server;
    in each of the session manager servers:
        initially operating in an idle state;
        entering an out of service state from the idle state when the first session is added and becomes in service;
        entering an in service state when the first session becomes the primary in service session; and
        starting a standby notification timer that is set to a pre-determined time period;
    in the session manager client:
        initially operating in an idle session state;
        entering an out of service state from the idle session state when a session becomes available;
        entering an active in service state from the out of service state when an Active notification is received over the first session and when no Standby notification has been received over any session;
        entering a full in service state from the out of service state upon receiving notifications that the first session is Active and that the second session is Standby; and
        entering a switchover state from the full in service state upon receiving notification that the second session is Active and no other in service Standby sessions are available; and
        entering the active in service state from the switchover state if the standby notification timer expires before a Standby notification associated with another session is received; and
    when the primary in service session fails, switching over the communications from the primary in service session to the other session of the first and second sessions while maintaining the voice and call communications and while ensuring that all messages generated by the gateway are sent to the gateway controller.

20. The method recited in claim 19, further comprising the step of:
    entering the full in service state from the switchover state upon receiving a Standby notification associated with another session before the standby notification timer expires.

21. The method recited in claim 19, further comprising the steps of:
    upon receiving notification that the first session has Standby status, entering the Standby In-Service state from the switchover state; and
    notifying the application that the session manager is "Down".

22. The method recited in claim 19, further comprising the step of:
    when the session manager client is in the switchover state, queuing messages to be communicated from the session manager client to the session manager server.

23. The method recited in claim 19, further comprising the steps of:

when the session manager client is in the full in service state;

receiving a hold notification;

in response to receiving a hold notification, activating a queue that is stored in association with the session manager client and storing each message of the session manager client directed to the session manager server in the queue.

24. The method recited in claim 23, further comprising the steps of:

when the session manager client is in the active in service state, receiving a notification to resume sending messages;

in response to the notification to resume sending messages, sending each message in the queue from the session manager client to the session manager server.

25. A method of providing continuous voice and call communications between a packet switched data network and a telephone call signaling network, the method comprising the steps of:

establishing a first session and a second session between a first gateway controller that receives the communications from the data network and a gateway that couples the communications to the telephone call signaling network, wherein the first gateway controller includes a session manager server and the gateway includes a session manager client that is logically coupled to and served by the session manager server;

initially operating the session manager server in an idle state;

in response to creation of a session, operating the session manager server in an out of service state;

when the session becomes the primary in service session, operating the session manager server in an in service state;

when the first session fails, switching over the communications from the first session to the second session.

26. The method recited in claim 25, further comprising the steps of:

when the first session fails, causing the session manager server to enter a recovery state;

starting a timer set to a pre-determined time value; and returning the session manager server to the in service state if the first session is restored as the primary session before the timer expires.

27. The method recited in claim 26, further comprising the step of:

maintaining the session manager server in the recovery state if another session is created when the session manager server is in the recovery state.

28. The method recited in claim 26, further comprising the step of:

causing the session manager server to enter the out of service state if the timer expires and the first session has not been restored as the primary session.

29. The method recited in claim 25, wherein the session manager client determines whether either of the first and second sessions should be the primary in service session.

30. A method of providing continuous voice and call communications between a packet switched data network and a telephone call signaling network, the method comprising the steps of:

establishing a first session and a second session between a first gateway controller that receives the communications from the data network and a gateway that couples the communications to the telephone call signaling network, wherein the first gateway controller includes a session manager server and the gateway includes a session manager client that is logically coupled to and served by the session manager server;

initially operating the session manager server in an idle state;

in response to creation of a session, operating the session manager server in an out of service state;

when the session becomes the primary in service session, operating the session manager server in an in service state;

storing a priority value in the gateway in association with each session;

causing the session manager client to enter a client in service state from a client out of service state when the session having the highest priority value becomes the primary in service session;

causing the session manager client to enter a switchover state from the client in service state when the in service session fails;

causing the session manager client to enter a degraded state from the switchover state when another session having a lower priority value becomes the primary in service session; and when the first session fails, switching over the communications from the first session to the second session.

31. The method recited in claim 30, further comprising the step of causing the session manager client to re-enter the in service state from the switchover state when the session having the highest priority value again becomes the primary in service session.

32. The method recited in claim 30, further comprising the step of causing the session manager client to re-enter the switchover state from the degraded state when the session having the highest priority value again becomes the primary in service session.

33. The method recited in claim 30, further comprising the steps of:

at the gateway, starting a switchover timer that is set to a pre-determined time value; and causing the session manager client to enter the out of service state from the switchover state when no session becomes the primary in service session before the switchover timer expires.

34. The method recited in claim 33, further comprising the steps of:

accumulating a switchover-failure counter that is stored in the gateway each time that the session manager client enters the out of service state from the switchover state;

causing the session manager client to enter an unstable state when the switchover-failure counter is equal to a pre-determined count.

35. The method recited in claim 30, further comprising the steps of causing the session manager client to enter the degraded state from the out of service state when a session having a priority value that is less than the highest priority value becomes the primary in service session.

36. A computer-readable medium carrying one or more sequences of instructions for providing continuous voice and call communications between a data network and a telephony network, wherein execution of the one or more sequences of instructions by one or more processors causes the one or more processors to perform the steps of:

establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

initializing to an idle state;

in response to creation of a session of the first and second sessions, entering an out of service state;

when a session of the first and second sessions becomes the primary in service session, entering an in service state; and when the primary in service session fails, switching over the communications from the primary in service session to the other session of the first and second sessions while maintaining the voice and call communications and while ensuring that all messages generated by the gateway are sent to the gateway controller.

37. A telecommunications system that provides continuous voice and call communications between a data network and a telephony network, comprising:

a first gateway controller that receives the communications from the data network;

a gateway that couples the communications to the telephony network and which is logically coupled to the first gateway controller over the data network;

a computer-readable medium carrying one or more sequences of instructions, wherein execution of the one or more sequences of instructions by one or more processors in the first gateway controller or the gateway causes the one or more processors to perform the steps of:

establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

initializes to an idle state;

in response to creation of a session of the first and second sessions, enters an out of service state;

when a session of the first and second sessions becomes the primary in service session, enters an in service state; and when the primary in service session fails, switching over the communications from the primary in service session to the other session of the first and second sessions while maintaining the voice and call communications and while ensuring that all messages generated by the gateway are sent to the gateway controller.

38. An apparatus that is capable of providing voice and call communications between a data network and a telephony network, the apparatus comprising:

means for establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

means for initializing to an idle state;

means for entering an out of service state in response to creation of a session of the first and second sessions;

means for entering an in service state when a session of the first and second sessions becomes the primary in service session; and means for switching over the communications from the primary in service session to the other session of the first and second sessions, when the primary in service session fails, while maintaining the voice and call communications and while ensuring that all messages generated by the gateway are sent to the gateway controller.

39. A computer-readable medium carrying one or more sequences of instructions for providing continuous voice and call communications between a data network and a telephony network, wherein execution of the one or more sequences of instructions by one or more processors causes the one or more processors to perform the steps of:

establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

storing a priority value in association with each session;

wherein the session manager server and the session manager client initialize to an idle state;

in response to creation of a session of the first and second sessions, enter an out of service state;

enter an in service state from the out of service state when the session having the highest priority value becomes the primary in service session;

enter a switchover state from the in service state when t the primary in service session fails;

wherein the session manager client enters a degraded state from the switchover state when another session having a lower priority value becomes the primary in service session; and when the primary in service session fails, switching over the communications from the primary in service session to .the other session of the first and second sessions while maintaining the voice and call communications and while ensuring that all messages generated by the gateway are sent to the gateway controller.

40. A telecommunications system that provides continuous voice and call communications between a data network and a telephony network, comprising:

a first gateway controller that receives the communications from the data network;

a gateway that couples the communications to the telephony network and which is logically coupled to the first gateway controller over the data network;

a computer-readable medium carrying one or more sequences of instructions, wherein execution of the one or more sequences of instructions by one or more processors in the first gateway controller or the gateway causes the one or more processors to perform the steps of:

establishing a first session and a second session between the first gateway controller and the gateway, wherein the first gateway controller includes a session manager server and the gateway includes a session manager client that is logically coupled to and served by the session manager server;

storing a priority value in association with each session;

wherein the session manager server and the session manager client initialize to an idle state;

in response to creation of a session of the first and second sessions, enter an out of service state;

enter an in service state from the out of service state when the session having the highest priority value becomes the primary in service session;

enter a switchover state from the in service state when the primary in service session fails;

wherein the session manager client enters a degraded state from the switchover state when another session having a lower priority value becomes the primary in service session; and when the primary in service session fails, switching over the communications from the primary in service session to the other session of the first and second sessions while maintaining the voice and call communications and while ensuring that all messages generated by the gateway are sent to the gateway controller.

41. An apparatus that is capable of providing continuous voice and call communications between a data network and a telephony network, the apparatus comprising:

means for establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

means for storing a priority value in association with each session;

wherein the session manager server and the session manager client include means for initializing to an idle state;

means for entering an out of service state in response to creation of a session of the first and second sessions;

means for entering an in service state from the out of service state when the session having the highest priority value becomes the primary in service session;

means for entering a switchover state from the in service state when the primary in service session fails;

wherein the session manager client includes means for entering a degraded state from the switchover state when another session having a lower priority value becomes the primary in service session; and means for switching over the communications from the primary in service session to the other session of the first and second sessions, when the primary in service session fails, while maintaining the!voice and call communications and while ensuring that all messages generated by the gateway are sent to the gateway controller.

42. A computer-readable medium carrying one or more sequences of instructions for providing continuous voice and call communications between a data network and a telephony network, wherein execution of the one or more sequences of instructions by one or more processors causes the one or more processors to perform the steps of:

establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

establishing the first session and the second session between a second gateway controller and the gateway, wherein the second gateway controller includes a second session manager server;

in each of the session manager servers:

initially operating in an idle state;

entering an out of service state from the idle state when the first session is added and becomes in service;

entering an in service state when the first session becomes the primary in service session; and starting a standby notification timer that is set to a pre-determined time period;

in the session manager client:

initially operating in an idle session state;

entering an out of service state from the idle session state when a session becomes available;

entering an active in service state from the out of service state when an Active notification is received over the first session and when no Standby notification has been received over any session;

entering a full in service state from the out of service state upon receiving notifications that the first session is Active and that the second session is Standby; and entering a switchover state from the full in service state upon receiving notification that the second session is Active and no other in service Standby sessions are available; and entering the active in service state from the switchover state if the standby notification timer expires before a Standby notification associated with another session is received; and when the primary in service session fails, switching over the communications from the primary in service session to the other session of the first and second sessions while maintaining the voice and call communications and while ensuring that all messages generated by the gateway are sent to the gateway controller.

43. A telecommunications system that provides continuous voice and call communications between a data network and a telephony network, comprising:

a first gateway controller that receives the communications from the data network;

a gateway that couples the communications to the telephony network and which is logically coupled to the first gateway controller over the data network;

a computer-readable medium carrying one or more sequences of instructions, wherein execution of the one or more sequences of instructions by one or more processors in the first gateway controller or the gateway causes the one or more processors to perform the steps of:

establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

establishing the first session and the second session between a second gateway controller and the gateway, wherein the second gateway controller includes a second session manager server;

in each of the session manager servers:
   initially operating in an idle state;
   entering an out of service state from the idle state when the first session is added and becomes in service;
   entering an in service state when the first session becomes the primary in service session; and
   starting a standby notification timer that is set to a pre-determined time period;

in the session manager client:
   initially operating in an idle session state;
   entering an out of service state from the idle session state when a session becomes available;
   entering an active in service state from the out of service state when an Active notification is received over the first session and when no Standby notification has been received over any session;
   entering a full in service state from the out of service state upon receiving notifications that the first session is Active and that the second session is Standby; and
   entering a switchover state from the full in service state upon receiving notification that the second session is Active and no other in service Standby sessions are available; and
   entering the active in service state from the switchover state if the standby notification timer expires before a Standby notification associated with another session is received; and when the primary in service session fails, switching over the communications from the primary in service session to the other session of the first and second sessions while maintaining the voice and call communications and while ensuring that all messages generated by the gateway are sent to the gateway controller.

44. An apparatus that is capable of providing continuous voice and call communications between a data network and a telephony network, the apparatus comprising:

means for establishing a first session and a second session between a first gateway controller that receives the communications from the data network and a gateway that couples the communications to the telephony network, wherein the first gateway controller includes a session manager server and the gateway includes a session manager client that is logically coupled to and served by the session manager server;

means for establishing the first session and the second session between a second gateway controller and the gateway, wherein the second gateway controller includes a second session manager server;

in each of the session manager servers:
   means for initially operating in an idle state;
   means for entering an out of service state from the idle state when the first session is added and becomes in service;
   means for entering an in service state when the first session becomes the primary in service session; and
   means for starting a standby notification timer that is set to a predetermined time period;

in the session manager client:
   means for initially operating in an idle session state;
   means for entering an out of service state from the idle session state when a session becomes available;
   means for entering an active in service state from the out of service state when an Active notification is received over the first session and when no Standby notification has been received over any session;
   means for entering a full in service state from the out of service state upon receiving notifications that the first session is Active and that the second session is Standby; and
   means for entering a switchover state from the full in service state upon receiving notification that the second session is Active and no other in service Standby sessions are available; and
   means for entering the active in service state from the switchover state if the standby notification timer expires before a Standby notification associated with another session is received; and means for switching over the communications from the primary in service session to the other session of the first and second sessions, when the primary in service session fails, while maintaining the voice and call communications and while ensuring that all messages generated by the gateway are sent to the gateway controller.

45. A computer-readable medium carrying one or more sequences of instructions for providing continuous voice and call communications between a packet switched data network and a telephone call signaling network, wherein execution of the one or more sequences of instructions by one or more processors causes the one or more processors to perform the steps of:

establishing a first session and a second session between a first gateway controller that receives the communications from the data network and a gateway that couples the communications to the telephone call signaling network, wherein the first gateway controller includes a session manager server and the gateway includes a session manager client that is logically coupled to and served by the session manager server;

initially operating the session manager server in an idle state;

in response to creation of a session, operating the session manager server in an out of service state;

when the session becomes the primary in service session, operating the session manager server in an in service state;

storing a priority value in the gateway in association with each session;

causing the session manager client to enter a client in service state from a client out of service state when the session having the highest priority value becomes the primary in service session;

causing the session manager client to enter a switchover state from the client in service state when the in service session fails;

causing the session manager client to enter a degraded state from the switchover state when another session having a lower priority value becomes the primary in service session; and when the first session fails, switching over the communications from the first session to the second session.

46. A telecommunications system that provides continuous voice and call communications between a packet switched data network and a telephone call signaling network, comprising:
- a first gateway controller that receives the communications from the data network;
- a gateway that couples the communications to the telephony network and which is logically coupled to the first gateway controller over the data network;
- a computer-readable medium carrying one or more sequences of instructions, wherein execution of the one or more sequences of instructions by one or more processors in the first gateway controller or the gateway causes the one or more processors to perform the steps of:
    - establishing a first session and a second session between a first gateway controller that receives the communications from the data network and a gateway that couples the communications to the telephone call signaling network, wherein the first gateway controller includes a session manager server and the gateway includes a session manager client that is logically coupled to and served by the session manager server;
    - initially operating the session manager server in an idle state;
    - in response to creation of a session, operating the session manager server in an out of service state;
    - when the session becomes the primary in service session, operating the session manager server in an in service state;
    - storing a priority value in the gateway in association with each session;
    - causing the session manager client to enter a client in service state from a client out of service state when the session having the highest priority value becomes the primary in service session;
    - causing the session manager client to enter a switchover state from the client in service state when the in service session fails;
    - causing the session manager client to enter a degraded state from the switchover state when another session having a lower priority value becomes the primary in service session; and
    - when the first session fails, switching over the communications from the first session to the second session.

47. An apparatus that is capable of providing continuous voice and call communications between a packet switched data network and a telephone call signaling network, the apparatus comprising:
- means for establishing a first session and a second session between a first gateway controller that receives the communications from the data network and a gateway that couples the communications to the telephone call signaling network, wherein the first gateway controller includes a session manager server and the gateway includes a session manager client that is logically coupled to and served by the session manager server;
- means for initially operating the session manager server in an idle state;
- means for operating the session manager server in an out of service state in response to creation of a session;
- means for operating the session manager server in an in service state when the session becomes the primary in service session;
- means for storing a priority value in the gateway in association with each session;
- means for causing the session manager client to enter a client in service state from a client out of service state when the session having the highest priority value becomes the primary in service session;
- means for causing the session manager client to enter a switchover state from the client in service state when the in service session fails;
- means for causing the session manager client to enter a degraded state from the switchover state when another session having a lower priority value becomes the primary in service session; and
- means for switching over the communications from the first session to the second session when the first session fails.

* * * * *